US009769866B2

(12) United States Patent
Kiss

(10) Patent No.: US 9,769,866 B2
(45) Date of Patent: Sep. 19, 2017

(54) METHODS AND APPARATUS TO SUPPORT NETWORK-BASED IP FLOW MOBILITY VIA MULTIPLE WIRELESS ACCESSES FOR A WIRELESS DEVICE

(71) Applicant: Apple Inc., Cupertino, CA (US)

(72) Inventor: Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 14/747,984

(22) Filed: Jun. 23, 2015

(65) Prior Publication Data
US 2015/0382393 A1  Dec. 31, 2015

Related U.S. Application Data

(60) Provisional application No. 62/019,414, filed on Jun. 30, 2014, provisional application No. 62/060,522, filed on Oct. 6, 2014.

(51) Int. Cl.
*H04W 76/02* (2009.01)
*H04L 12/709* (2013.01)
*H04L 12/721* (2013.01)

(52) U.S. Cl.
CPC ....... *H04W 76/026* (2013.01); *H04W 76/022* (2013.01); *H04L 45/245* (2013.01); *H04L 45/38* (2013.01)

(58) Field of Classification Search
CPC ... H04W 40/34; H04W 76/02; H04W 76/022; H04W 76/026; H04W 76/04;
(Continued)

(56) References Cited

U.S. PATENT DOCUMENTS 9,319,938 B2 *   4/2016  Sun ................. H04W 28/10
2005/0153692 A1*  7/2005  Hwang ............. H04W 48/12
455/434
(Continued)

FOREIGN PATENT DOCUMENTS

KR   20120065174 A   6/2012
WO   2013066093 A1   5/2013
(Continued)

OTHER PUBLICATIONS

LTE, Generation Partnership Project (3GPP), "Universal Mobile Telecommunications System (UMTS); LTE; IP flow mobility and seamless Wireless Local Area Network (WLAN) offload; Stage 2", ETSI TS 123.261 version 10.1.0 Release 10, May 2011; pp. 1-23.*
(Continued)

*Primary Examiner* — Tri H Phan
(74) *Attorney, Agent, or Firm* — Downey Brand LLP

(57) ABSTRACT

Apparatus and methods to support IP flow mobility (IFOM) via multiple wireless accesses in a wireless device are disclosed. The wireless device initiates network-based IFOM (NB-IFOM) to establish and manage IP flows. Support for NB-IFOM is negotiated during initial attach procedures to either or both wireless accesses and by using packet data network (PDN) connectivity procedures. The wireless device sends routing rules including priorities to apply to both existing and future IP flows or to future IP flows only. The wireless device requests to move IP flows from a source access to a target access. When a new wireless access is added to an existing PDN connection, an identical IP address for the wireless device is allocated as used for the existing PDN connection. The network establishes a GPRS tunneling protocol (GTP) tunnel for the new wireless access while maintaining a previously established GTP tunnel for the existing wireless access.

20 Claims, 11 Drawing Sheets

(58) Field of Classification Search
CPC ..... H04W 84/02; H04W 84/06; H04W 88/06; H04L 12/66; H04L 12/70; H04L 12/709; H04L 45/38; H04L 45/245
See application file for complete search history.

(56) References Cited

U.S. PATENT DOCUMENTS

| | | | | |
|---|---|---|---|---|
| 2012/0257598 | A1* | 10/2012 | Karampatsis | H04W 8/082 370/331 |
| 2012/0324100 | A1* | 12/2012 | Tomici | H04L 45/123 709/224 |
| 2013/0021968 | A1* | 1/2013 | Reznik | H04W 36/026 370/328 |
| 2013/0070596 | A1* | 3/2013 | Yeh | H04W 36/0038 370/235 |
| 2014/0161055 | A1* | 6/2014 | Chitrapu | H04W 72/12 370/329 |
| 2014/0177446 | A1* | 6/2014 | Sun | H04L 45/38 370/236 |
| 2014/0211626 | A1* | 7/2014 | Liu | H04W 28/08 370/235 |
| 2015/0063331 | A1* | 3/2015 | Scahill | H04W 48/16 370/338 |
| 2015/0078359 | A1* | 3/2015 | Scahill | H04W 48/16 370/338 |
| 2016/0135219 | A1* | 5/2016 | Jain | H04W 40/06 370/329 |
| 2016/0135222 | A1* | 5/2016 | Jain | H04W 74/04 370/329 |
| 2016/0149916 | A1* | 5/2016 | Lindheimer | H04L 63/162 726/4 |
| 2017/0026824 | A1* | 1/2017 | Kim | H04W 8/08 |
| 2017/0034734 | A1* | 2/2017 | Ahmadi | H04W 28/0205 |
| 2017/0048739 | A1* | 2/2017 | Jeong | H04W 24/10 |

FOREIGN PATENT DOCUMENTS

| | | |
|---|---|---|
| WO | 2014098496 A1 | 6/2014 |
| WO | 2014098505 A1 | 6/2014 |

OTHER PUBLICATIONS

International Patent Application No. PCT/US2015/037764—PCT Search Report and Written Opinion dated Oct. 8, 2015.
Taiwanese Patent Application No. 104121184—Office Action dated Aug. 1, 2016.
"3rd Generation Partnership Project; Technical Specification Group Services and System Aspects; Network based IP flow mobility (Release 13)," 3GPP TR 23.861 V1.8.0 (May 2014), May 2014, 79 pages.

* cited by examiner

300

| Routing Rule Name | Routing Access Type | Rule Priority | Rule ID | Applicable To Existing Flows? | Routing Filter (Traffic Selector) |
|---|---|---|---|---|---|
| Rule Name 1 | 3GPP | x | ID 1 | Y/N | Description of IP flows ... |
| Rule Name 2 | 3GPP | y | ID 2 | Y/N | Description of IP flows ... |
| Rule Name 3 | WLAN | z | ID 3 | Y/N | Description of IP flows ... |

*FIG. 3A*

METHODS AND APPARATUS TO SUPPORT NETWORK-BASED IP FLOW MOBILITY VIA MULTIPLE WIRELESS ACCESSES FOR A WIRELESS DEVICE

CROSS-REFERENCE TO RELATED APPLICATIONS

This application claims the benefit of U.S. Provisional Application No. 62/019,414, entitled "METHODS AND APPARATUS TO SUPPORT IP FLOW MOBILITY VIA MULTIPLE WIRELESS ACCESSES FOR A WIRELESS COMMUNICATION DEVICE," by Kiss, filed on Jun. 30, 2014, and U.S. Provisional Application No. 62/060,522 entitled "METHODS AND APPARATUS TO SUPPORT NETWORK-BASED IP FLOW MOBILITY VIA MULTIPLE WIRELESS ACCESSES FOR A WIRELESS DEVICE," by Kiss, filed on Oct. 6, 2014, the contents of each of which are hereby incorporated by reference in their entirety for all purposes.

FIELD

The described embodiments generally relate to wireless communications, and more particularly, to methods and apparatus to support a network-based Internet Protocol (IP) Flow Mobility via both cellular access and wireless local area network access for a wireless communication device.

BACKGROUND

Fourth generation (4G) cellular wireless networks employing newer radio access technology that implements one or more 3 Generation Partnership Project (3GPP) Long Term Evolution (LTE) and LTE Advanced (LTE-A) standards are rapidly being developed and deployed by network operators worldwide. The newer cellular wireless networks provide a range of packet based services in parallel with legacy second generation (2G) and third generation (3G) wireless networks that can provide both circuit-switched voice services and packet-switched data services. The cellular wireless networks also overlap with multiple wireless local area network (WLAN) based networks that may provide additional localized high-speed packet data access for various services. Wireless communication devices can include capabilities to connect with different types of wireless networks, e.g., based on what wireless networks are available at a particular location, based on various capabilities of available wireless networks, based on capabilities of the wireless communication device, based on properties of particular services provided by one or more of the wireless networks, and/or based on service subscriptions with which the wireless communication device is associated. Wireless communication devices can include wireless radio circuitry that provides for simultaneous communication via multiple radio frequency interfaces that can connect through different wireless networks in parallel. Applications running on the wireless communication device can advantageously generate and receive data through different packet data connections via different wireless networks as suited to the application. Different applications can provide access to services provided by the different wireless networks, and which particular wireless network is used to provide access for an application can be based on a variety of conditions. As such, there exists a need for solutions that enable management of multiple network-based Internet Protocol (IP) flows across multiple wireless interfaces that provide connections to multiple wireless access networks in parallel for a wireless communication device.

SUMMARY

Apparatus and methods to support IP flow mobility via multiple wireless accesses, e.g., a cellular wireless access and a wireless local area network (WLAN) access in a wireless communication device, such as user equipment (UE), are disclosed. Representative embodiments of methods and apparatuses for managing multiple IP flows via multiple wireless access networks are provided herein. Solutions provided herein may be used as part of a 3GPP wireless communication protocol, such as 3GPP TR 23.861 and 3GPP TS 23.261 currently under standardization development.

UE-initiated network-based IP flow mobility (NB-IFOM) provides for the UE to establish and manage IP flows through multiple wireless access networks simultaneously, including via heterogeneous wireless access networks, such as through a 3GPP cellular wireless access network and a non-3GPP IP wireless access network (e.g., a WLAN access) in parallel. Support for NB-IFOM is negotiated by the UE through one or both parallel wireless access networks in communication with various network elements included in and/or associated with a core network, e.g., as part of an initial attach procedure of the UE to either or both wireless access networks and using UE requested packet data network (PDN) connectivity procedures. The UE can indicate support for NB-IFOM to a 3GPP wireless access network (and its associated core network) using Protocol Configuration Options (PCO) included in one or more non-access stratum (NAS) messages. The UE can also indicate support for NB-IFOM to a non-3GPP IP wireless access network, e.g., a WLAN, using Internet Key Exchange Version 2 (IKEv2) protocol signaling.

The UE can send routing rules, which can be enforced for one or more IP flows to which NB-IFOM applies, to a mobility management entity (MME) via the 3GPP wireless access network using NAS signaling messages. The UE can also send routing rules to an evolved packet data gateway (ePDG) via the non-3GPP IP access network using IKEv2 signaling messages. The routing rules can provide information to enable IP flow mobility and can include attributes such as a rule identifier, one or more routing filters (also referred to as traffic selectors), priorities for the rules, and to which access type the rule applies. The UE can indicate priorities for the routing rules to indicate an order in which rules are applied, and a lowest priority rule can indicate a default route for packets. During IP flow mobility procedures, the UE can update priorities associated with routing rules, change routing access types associated with routing rules, create new routing rules, and/or remove existing muting rules. Routing rules can apply to both existing IP flows and future IP flows yet to be established, in some instances, and to future IP flows only, in some instances. When adding a new access in parallel with an existing access, the UE can quickly move traffic to the new access by preparing the new access for IP flow mobility when need arises. This can be achieved, in some instances, by providing routing rules without a routing filter indicating that no traffic shall be routed on the newly added access. The UE can request to move IP flows from a source access to a target access by sending requests for an IP flow transfer, e.g., to the target access. When establishing connections for IP flow mobility via a non-3GPP IP access network, the ePDG, based on the presence of one or more routing rules in the IKEv2 communication, can communicate an NB-IFOM indication along with one or more routing rules in messages sent to a PDN gateway. Similarly, when establishing connections for IP flow mobility via a 3GPP cellular access network, the UE can communicate messages with the MME including an NB-IFOM indication and one or more routing rules. The MME can communicate an NB-IFOM indication along with one or more routing rules in messages sent to a serving gateway (S-GW), which can provide messages in turn to a PDN gateway. When a new wireless access is added to an existing PDN connection, based on an NB-IFOM indication, the PDN gateway can allocate an identical IP address for the UE as used for the existing PDN connection. The PDN gateway can also establish a new GPRS tunneling protocol (GTP) tunnel for the new access, while maintaining a previously established GTP tunnel for the existing access, when valid routing rules exist for the existing wireless access.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIG. 3A illustrates a table of routing rules for IP flow mobility, in accordance with some embodiments.

DETAILED DESCRIPTION

Figure 1:
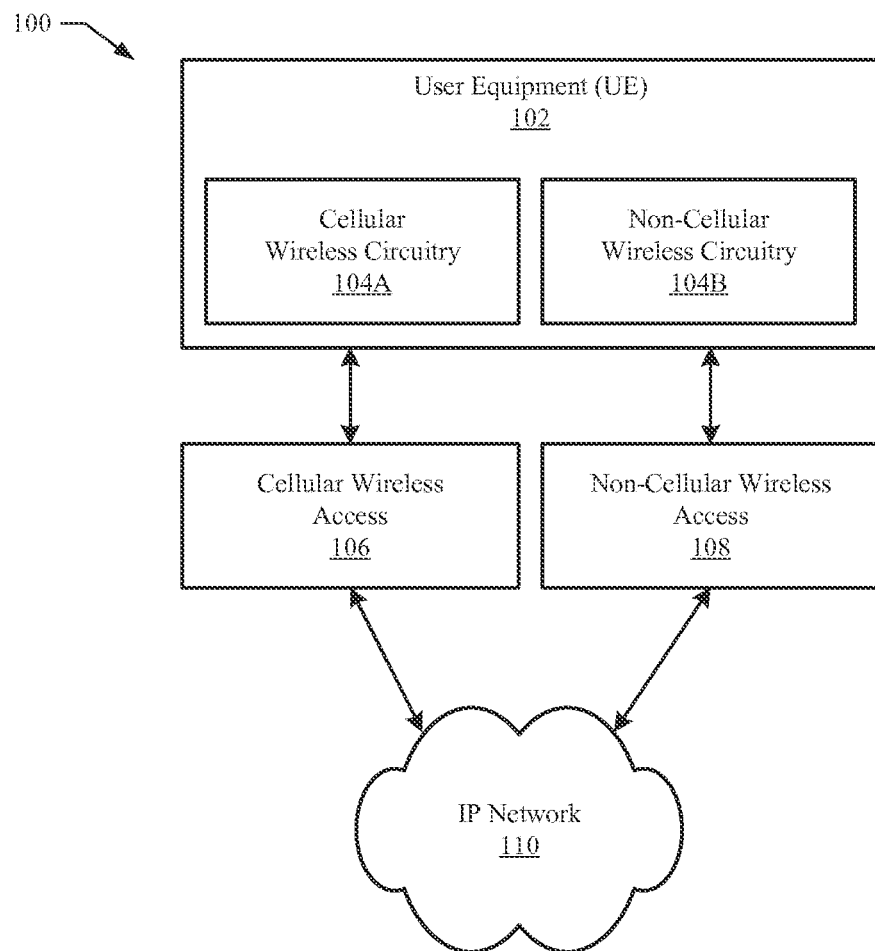
FIG. 1 illustrates a wireless communication device connected in parallel through a cellular wireless access network and a non-cellular wireless access network, in accordance with some embodiments.

Representative examples for managing multiple IP flows via multiple wireless access networks for a wireless communication device are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

One or more aspects of the disclosure presented herein may be used in conjunction with one or more Third Generation Partnership Project (3GPP) wireless communication protocols, which may be developed as one or more technical reports and formalized as one or more technical standards. Solutions provided herein may be used in conjunction with the 3GPP technical report (TR) 23.861 and technical specification (TS) 23.261, which address network-based IP flow mobility for Release 13 of the 3GPP wireless communication standards. 3GPP TR 23.861 v1.8.0 is incorporated by reference herein in its entirety for all purposes. The 3GPP Release 13 Network-based IP flow mobility (NB-IFOM) work item includes a set of requirements and recommended solutions for wireless devices that include multiple interfaces that can be connected simultaneously to two different access networks. Release 13 (and/or subsequent releases) of one more 3GPP TR and/or TS documents may address aspects of NB-IFOM as described herein. NB-IFOM solutions can include simultaneous access for a PDN connection, association of IP flows of a PDN connection with a particular access system, movement of IP flows of a PDN connection between access systems, and triggers to initiate and/or change IP flow mobility by a UE and/or by a network element. One or more 3GPP TR and/or TS documents can also address the impact and relationship (if any) between parallel 3GPP related policies and NB-IFOM support. Representative 3GPP policies that may be affected by NB-IFOM can include "Policy and Charging Control" (PCC), "Access Network Discovery and Selection Function" (ANDSF), "Inter-System Routing Policy" (ISRP), "Inter-System Mobility Policy" (ISMP), Radio Access Network (RAN) policies, etc.

References are made in this section to the accompanying drawings, which form a part of the disclosure and in which are shown, by way of illustration, various implementations corresponding to the described embodiments herein.

Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) LTE and LTE Advanced (LTE-A) or similar "later generation" cellular wireless access communication capabilities as well as wireless local area network communication capabilities. In various embodiments, these capabilities may allow a respective UE to communicate and manage simultaneous IP flows via multiple wireless access networks.

Additionally, it should be understood that the UEs described herein may be configured as multi-mode wireless communication devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, and LTE-A standards or 3GPP2's CDMA2000 (1×RTT, 2×EV-DO, HRPD, eHRPD) standards. Multi-mode UEs can also support communication using wireless local area networking protocols, e.g., IEEE 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

As described herein, a UE-initiated network-based IP flow mobility (NB-IFOM) solution enables the UE to establish and manage multiple IP flows through multiple wireless access networks, including heterogeneous wireless access networks such as a 3GPP cellular wireless access network and a non-3GPP IP packet based wireless network, such as a WLAN access network, simultaneously. Support for NB-IFOM can be negotiated by the UE through both the 3GPP cellular wireless access network and through the WLAN access network, e.g., as part of initial attach procedures and UE requested packet data network (PDN) connectivity procedures, during which the UE negotiates for and establishes initial connections to one or both of the 3GPP cellular wireless access network and the WLAN access network. The UE can indicate support for NB-IFOM to the 3GPP cellular wireless access network (and the wireless core network to which the 3GPP cellular wireless access network connects) using Protocol Configuration Options (PCO) as part of one or more non-access stratum (NAS) messaging procedures during an initial attach to the 3GPP cellular wireless access network. The UE can also indicate support for NB-IFOM to the WLAN access network using Internet Key Exchange Version 2 (IKEv2) Protocol signaling during an initial attach to the WLAN access network. Similarly, in some embodiments, a 3GPP network, via one or more network elements, can indicate support for NB-IFOM to the UE using IKEv2 Protocol signaling, e.g., as part of one or more exchanges between the UE and a network element, as described further herein.

IKEv2 is an Internet Engineering Task Force (IETF) specified protocol described in the Request For Comments (RFC) 5996 document, which is incorporated by reference herein in its entirety for all purposes. The IKEv2 signaling protocol can be used to establish a security association between the UE and a network element, e.g., an evolved packet data gateway (ePDG), such as when establishing an Internet Protocol Security (IPsec) Encapsulated Security Protocol (ESP) tunnel between the UE and the network element to provide for secure communication between the UE and the network, such as based on mutual authentication and cryptographic key negotiation. The IKEv2 signaling protocol can also be used to exchange additional information between the UE and the ePDG using an extensibility mechanism, e.g., using information messages and information exchange sequences as defined, at least in part, in Sections 1.4 and 1.5 of RFC 5996.

NB-IFOM capability can provide for flexible use of multiple accesses for a given connection between a UE and a PDN gateway. The use of both 3GPP cellular access and non-3GPP IP access, such as via a WLAN, which can include both trusted access via an S2a reference point and untrusted access via an S2b reference point, can allow for flexible routing of IP packets between different accesses for the same PDN connection. NB-IFOM can provide for support of a PDN connection through multiple access systems simultaneously, an association of one or more IP flows of a PDN connection to a particular access system, and the movement of one or more IP flows of a PDN connection between different access systems. NB-IFOM solutions, as defined in one or more communication protocol standards, can indicate triggers that can result in IP flow movement, whether initiated by the UE or by the network. In some scenarios, a UE can seek to establish NB-IFOM capabilities for a PDN connection and/or to adjust IP flows of a PDN connection. The UE can indicate support for NB-IFOM for a particular PDN connection when establishing that connection, e.g., via IKEv2 signaling messages as described further herein. The network can respond by accepting, rejecting, and/or modifying aspects of NB-IFOM support for the PDN connection referenced by the UE. The UE and/or the network can also modify aspects of NB-IFOM for a particular established PDN connection through another exchange of IKEv2 signaling messages as described further herein.

For a connection via a 3GPP wireless access network, the UE can send one or more routing rules, which can be enforced for one or more IP flows to which NB-IFOM can apply, by using one or more non-access stratum (NAS) signaling messages sent to a mobility management entity (MME) in a core network to which the 3GPP wireless access network is communicatively coupled. For a connection via a WLAN access network, the UE can send one or more routing rules, which can be enforced for one or more IP flows to which NB-IFOM can apply, by using one or more IKEv2 signaling messages sent to an evolved packet data gateway (ePDG). At least one default routing rule can exist to apply to packets communicated by the IP flows when the packets do not match to any of the one or more routing rules negotiated during an initial attach procedure between the UE and the 3GPP wireless access network and/or the WLAN access network. The UE can provide a set one or more relative priorities of the routing rules. The routing rule having the lowest priority can be used as a default route for packets among the routing rules that are valid at the time of the evaluation. When the UE performs IP flow mobility procedures, the UE can update one or more priorities associated with a routing rule, change a routing access type associated with a particular routing rule, create new routing rules, and/or remove existing routing rules. In some embodiments, priorities can be indicated using numerical identifiers, such as non-negative integers, and a "higher" valued integer assigned as a rule priority for a particular rule can indicate that the rule has a "higher" priority than rules having "lower" valued integers. Thus, for example, a priority "1" can have a lowest priority level, i.e., be executed last. Other assignments between rule priority values, their relative meaning, and an order of execution can also be used in various embodiments, and the particular example described is provided for illustration only.

For the IP flow mobility processes disclosed herein, when a routing rule becomes valid, the routing rule can be applied in some instances to all IP flows, including both existing IP flows and future IP flows yet to be established. In some instances, when a routing rule becomes valid, the routing rule can be applied to future IP flows only. When adding access via a wireless access network (e.g., adding a cellular wireless access to an existing WLAN access, or alternatively adding a WLAN access to an existing cellular wireless access), the UE can provide routing rules without a routing filter, which can thereby indicate that no traffic is to be routed on the newly added access. With this indication, the UE can prepare the new access for IP flow mobility, i.e., the UE can quickly move traffic to a new access when need arises without waiting for a possibly lengthy authentication process to complete for the new access at the time of the IP flow mobility procedure.

The UE can, in some embodiments, request to move IP flows from a source access (e.g., a WLAN access or a cellular wireless access) onto a target access (e.g., another WLAN access or cellular wireless access) by sending one or more requests for an IP flow transfer. In some embodiments, it is preferable to send the request to move the IP flows to the target access. In some embodiments, the UE can decide whether to send the IP flow transfer request to the source access, the target access, or both the source access and the target access.

When establishing connections for IP flow mobility through a WLAN access network, (or more generally, as part of IP flow mobility management), the ePDG, based on the presence of one or more routing rules in the IKEv2 communication, can communicate an NB-IFOM indication along with one or more routing rules by sending a "Create Session Request" message to a packet data network (PDN) gateway. Similarly when establishing connections for IP flow mobility through a 3GPP cellular wireless access network, the UE can send an "Attach Request" message including a "Request Type" that provides an NB-IFOM indication request type and one or more routing rules to the MME. The MME can include one or more routing rules and an NB-IFOM indication in a "Create Session Request" message communicated to a Serving Gateway (S-GW), which can provide messages in turn to a PDN gateway (GW).

When a new wireless access is added to an existing PDN connection, based on the presence of an NB-IFOM indication in a "Create Session Request" message, the PDN GW can allocate an identical IP address for the UE as used for the existing PDN connection that the UE previously established over an existing wireless access. The PDN GW can establish a new GPRS Tunneling Protocol (GTP) tunnel for the new access while also maintaining a previously established GTP tunnel for the existing access when valid routing rules exist for the existing wireless access.

FIG. 1 illustrates a wireless system 100 that includes user equipment (UE) 102, which includes wireless circuitry that can be configured to connect the UE 102 with one or more wireless networks in parallel. The UE 102 includes both cellular wireless circuitry 104A, which can be configured to connect the UE 102 through a cellular wireless access 106 to various services provided via a packet-based Internet Protocol (IP) network 110, and non-cellular wireless circuitry 104B, which can be configured to connect the UE 102 through a non-cellular wireless access 108 to the same IP network 110. An LTE evolved packet system (EPS) provides services to the UE 102, both "real-time" services, such as voice/video conference calls, and data communication services, such as web browsing and email access, using an IP protocol. The LTE EPS, as introduced in the Release 8 3GPP wireless communication standard, defines an architecture in which heterogeneous wireless access systems, such as a combination of cellular wireless access 106 and non-cellular wireless access 108, can be used by the UE 102 to connect to a common core network (not shown). As described further herein, the UE 102 can establish a packet data network (PDN) connection through at least one wireless access and subsequently add a second wireless access. Thus, the UE 102 can communicate over multiple wireless accesses, such as the cellular wireless access 106 and the non-cellular wireless access 108, simultaneously using the same PDN connection. As described herein, one or more IP flows of the PDN connection can be associated with a particular access system and can also be moved between different wireless access systems. An IP flow can be defined as a unidirectional flow of IP packets originating from a particular source IP address and port number and terminating at a particular destination IP address and port number. All of the IP packets of an IP flow start at the same source, end at the same destination, and use the same transport protocol. In some embodiments, port numbers of the source and/or the destination are applicable only if used by the transport protocol of the IP flow. With IP flow mobility, the IP packets can be moved between accesses, e.g., from 3GPP cellular access 206 to non-3GPP IP access 208 or vice versa, without re-establishing the PDN connection to which they apply.

In some embodiments, the UE 102 can initiate the establishment and/or trigger the movement and/or adjust properties of one or more IP flows. In a representative embodiment, the UE 102 connects to the LTE EPS through a 3GPP cellular wireless access system and through a wireless local area network (WLAN) system simultaneously and the network uses a network-based mobility protocol to handle the mobility of the UE 102. The UE 102 manages multiple IP flows through the simultaneous connections via the heterogeneous wireless access systems. In some embodiments, the network-based mobility protocol is the general packet radio system (GPRS) tunneling protocol (GTP) on the S5 and S8 reference points. In some embodiments, the network-based mobility protocol is also GTP on the S2b (untrusted WLAN access) reference point.

The cellular wireless circuitry 104A and the non-cellular wireless circuitry 104B provide for wireless radio frequency (RF) connections between the UE 102 and parallel wireless networks that interconnect with the IP network 110 via the cellular wireless access 106 and the non-cellular wireless access 108 respectively. In some embodiments, the wireless circuitry 104A/B includes one or more baseband processor(s), and a set of RF analog front-end circuitry. In some embodiments, the wireless circuitry 104A/B and/or a portion thereof can include or be referred to as one or more wireless transmitter(s)/receiver(s) or transceiver(s) or radio(s). The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 104A/B can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless access networks and/or wireless access equipment included therein.

Figure 2A:
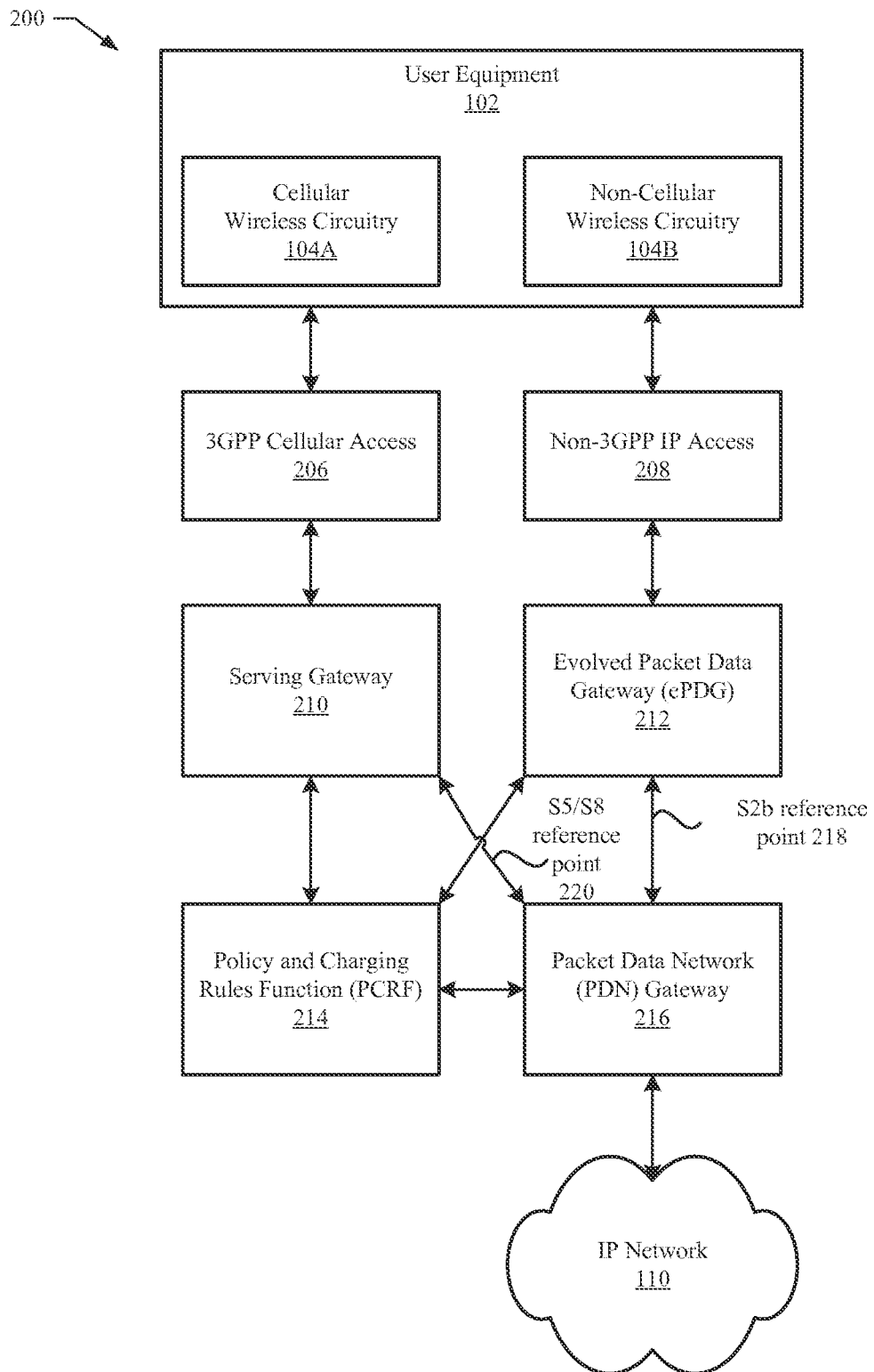
FIG. 2A illustrates components of wireless access networks and a core network, in accordance with some embodiments.

FIG. 2A illustrates a wireless system 200 that includes the UE 102 communicatively coupled to the IP network 110 through both a 3GPP cellular access 206 and a non-3GPP IP-based wireless access 208. In some embodiments, the 3GPP cellular access 206 includes an evolved universal terrestrial access network (E-UTRAN) or other network elements of an LTE/LTE-A wireless network. In some embodiments, the non-3GPP IP access 208 includes a wireless local area network (WLAN) or portions thereof, e.g., a wireless access point, and thus the non-3GPP IP access 208 can also be referred to as a WLAN access in some embodiments. The UE 102 can be configured to simultaneously connect to a given packet data network (PDN) through both the 3GPP cellular access 206 and the non-3GPP IP-based wireless access 208. The UE 102 can also be configured to add an IP flow to, delete an IP flow from, and/or move an IP flow between one or the other of the parallel wireless accesses, e.g., the 3GPP cellular access 206 and the non-3GPP IP-based wireless access 208, for a PDN connection. The 3GPP cellular access 206 connects to a serving gateway (GW), which connects to a PDN gateway 216 through an S5 reference point 220 or an S8 reference point 220 for roaming users. The PDN gateway 216 provides a connection to the IP network 110 through which a variety of services. The non-3GPP IP access 208 connects to an evolved packet data gateway (ePDG) 212, which connects to the PDN gateway 216 through an S2b reference point 218. Each of the serving gateway 210, the ePDG 212, and the PDN gateway 216 are also connected to a policy and charging rules function (PCRF) 214. For NB-IFOM, the UE 102 can establish and maintain a PDN connection through both the 3GPP cellular access 206 and the non-3GPP IP access 208 simultaneously. For UE-initiated NB-IFOM, the UE 102 can provide to the PDN gateway 216 a request to add to, delete from, and/or transfer to and access an IP flow, and the PDN gateway 216 can accept or reject the UE 102 request for IP flow mobility. For "network initiated" (NW-initiated) NB-IFOM, the PDN gateway 216 can provide to the UE 102 a request to add, delete, and/or transfer an IP flow to an access, and the UE 102 can accept or reject the request from the PDN gateway 216. In some embodiments, the ePDG 212 coordinates the network side of NB-IFOM by collecting information from and distributing information to other network elements to support the NB-IFOM capability. In some embodiments, the ePDG 212 communicates requests from the PDN gateway 216 to the UE 102 and communicates responses from the UE 102 to the PDN gateway 216 to support the NB-IFOM capability.

The 3GPP S2b reference point 218 between the ePDG 212 and the PDN gateway 216 provides a mechanism to allow the UE 102, when attached via an untrusted non-3GPP IP access network (e.g., non-3GPP IP access 208), to connect securely via a 3GPP evolved packet system (EPS) network to the IP network 110 and to access IP services via the secure connection. The UE 102 can establish a secure connection, e.g., an Encapsulating Security Payload (ESP) tunnel based on an IP Security (IPsec) protocol, using an IKEv2 protocol signaling exchange between the UE 102 and the ePDG 212, which in turn can establish a secure tunnel, e.g., a Proxy Mobile IPv6 (PMIP) or GTP tunnel, to the PDN gateway 216 when a session for the UE 102 is anchored.

Support for NB-IFOM

In some embodiments, for the 3GPP cellular access 206, support for NB-IFOM can be negotiated during an initial attach of the UE 102 and UE requested PDN connectivity procedures, e.g., as defined in 3GPP TS 23.401, which is incorporated by reference herein in its entirety for all purposes. In some embodiments, for the non-3GPP IP access 308, such as a WLAN access, support for NB-IFOM can be negotiated during an initial attach of the UE 102 and UE-initiated PDN connectivity procedures, e.g., as defined in 3GPP TS 23.402, which is incorporated by reference herein in its entirety for all purposes.

In some embodiments, for the non-3GPP IP access 308, e.g., such as a WLAN access, when establishing a new PDN connection and/or for an established PDN connection via the S2b reference point 218, the UE 102 and the ePDG 212 can negotiate support for NB-IFOM using an IKEv2 message exchange. The UE 102 and the ePDG 212 can also exchange routing rules necessary for routing IP flows with NB-IFOM using an IKEv2 message exchange. The UE 102 and the ePDG 212 can be considered as IKEv2 peers that exchange information as part of a "configuration payload exchange" using one or more IKEv2 attributes. In some embodiments, the IKEv2 attributes used for negotiation of NB-IFOM support and/or for an exchange of routing rules can be formatted in accordance with attribute formats as defined in the IETF RFC 5996, e.g., as shown in one or more of Sections 1.4, 1.5, and 3.15. NB-IFOM can support both mobility initiated by the UE 102 and/or initiated from a network, e.g., via the ePDG 212. When the UE 102 initiates NB-IFOM, the UE 102 can indicate support and can propose routing rules, which the network can accept or modify. Alternatively, when the network initiates NB-IFOM, e.g., using the ePDG 212 as a point of negotiation with the UE 102, the network can provide a set of routing rules that the UE 102 can accept or modify. Protocol extensions for IKEv2 to support NB-IFOM requirements are described further herein. New IKEv2 attributes for NB-IFOM S2b access that can be used for communication between the UE 102 and the ePDG 212 are described herein, and may be defined in one or more 3GPP specifications and/or registered for use with the Internet Assigned Numbers Authority (IANA).

IKEv2 Extensions

Figure 2B:
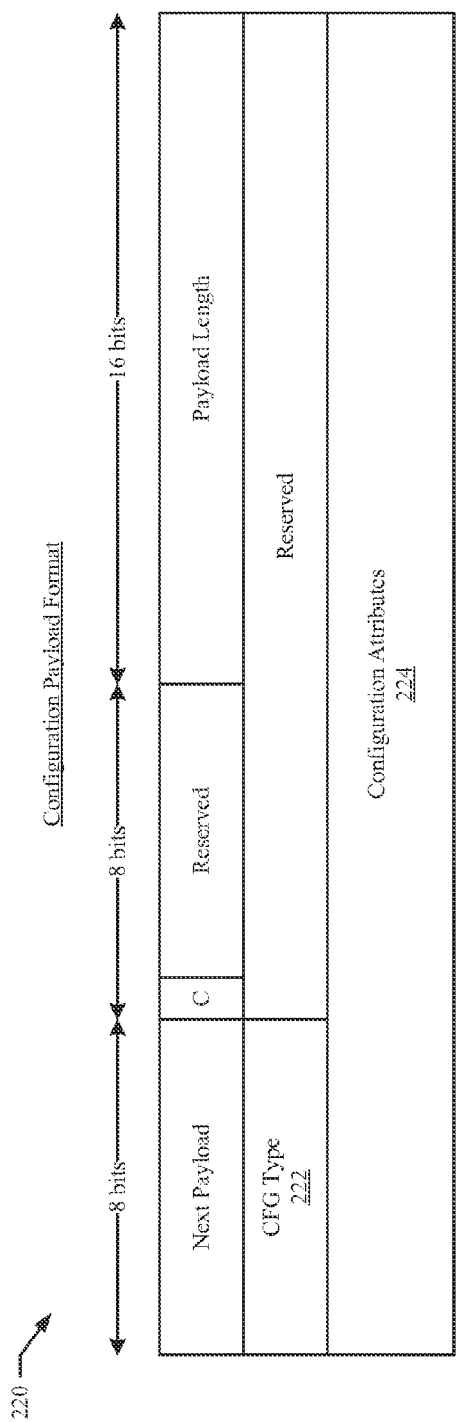
FIGS. 2B and 2C illustrate representative configuration payload and configuration attribute formats, in accordance with some embodiments.
Figure 2C:
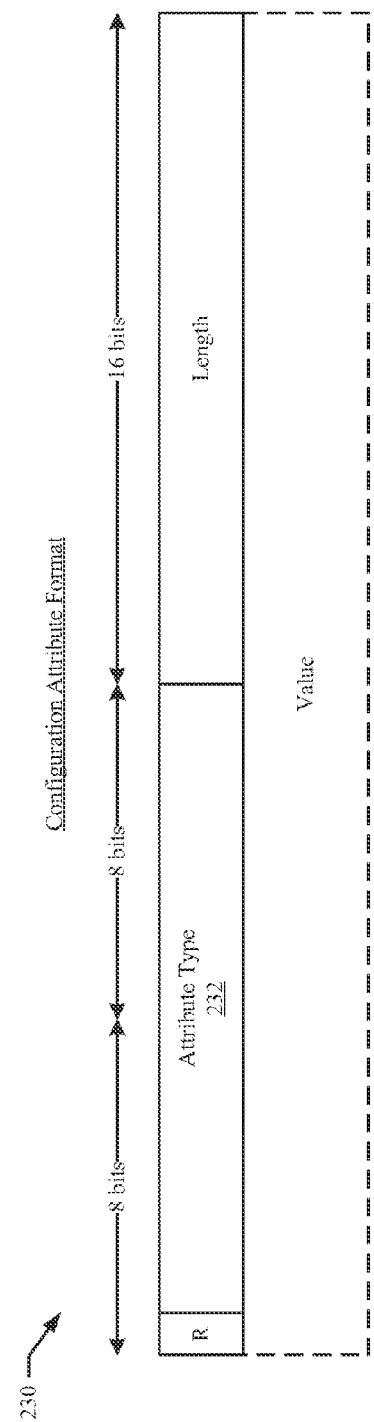

IKEv2 attributes, as defined herein, can be exchanged between IKEv2 peers (e.g., the UE 102 and the ePDG 212) as part of a "configuration payload exchange." The attributes can be formatted in accordance with formats as defined in Section 3.15.1 of RFC 5996. FIG. 2B illustrates a representative configuration payload format 220, in accordance with some embodiments. The configuration payload can be used to exchange configuration information between IKEv2 peers. The CFG type 222 field can include one octet and can indicate a type for the exchange. Representative defined CFG types include a CFG_REQUEST type with a value of "1", a CFG_REPLY type with a value of "2", a CFG_SET type with a value of "3", and a CFG_ACK type with a value of "4". Reserved fields can be set to zero when sent and ignored when received. The Configuration Attributes 224 field can be of variable length and can use a "type length value" (TLV) structure to define its payload as shown by the representative contribution attribute format 230 in FIG. 2C. The reserved ("R") bit can be set to zero when sent and ignored on receipt as defined in RFC 5996. A value for the attribute type 232 field of fifteen bits, which provides a unique identifier for each configuration attribute type, can be reserved by the IANA to indicate support for network-based IP flow mobility and included in an IKEv2 parameter table. In some embodiments, an IKEv2 configuration attribute can be specified as an NB-IFOM_SUPPORT configuration attribute that has a particular attribute type 232 value reserved by the IANA. The length field of sixteen bits can include a value of "zero", which can thus indicate that the value field for the NB-IFOM_SUPPORT configuration attribute is empty (shown as a dashed box in FIG. 2C).

The presence of an NB-IFOM_SUPPORT configuration attribute in a CFG_SET configuration payload or in a CFG_REPLY configuration payload can indicate support for NB-IFOM procedures for a particular PDN connection that is set up for an access point name (APN) referenced in an identification (IDr) payload. The lack of an NB-IFOM_SUPPORT configuration attribute in a CFG_SET configuration payload or in a CFG_REPLY configuration payload can indicate no support for NB-IFOM procedures for a particular PDN connection. Thus the UE 102 and/or the ePDG 212 can indicate NB-IFOM support positively by including the NB-IFOM_SUPPORT configuration attribute in the applicable configuration payload of an IKEv2 message for a particular PDN connection or can indicate a lack of support negatively for the particular PDN connection by not including the NB-IFOM_SUPPORT configuration attribute in the applicable configuration payload of the IKEv2 message.

The presence of an NB-IFOM_SUPPORT configuration attribute in a CFG_REQUEST configuration payload can indicate a request for information about an IKEv2 peer's support for NB-IFOM procedures for a particular PDN connection that is established for an APN referenced in an IDr payload. As the UE 102 can establish separate IPSec tunnels to the same ePDG 212 for each PDN connection that the UE 102 would like to establish, the UE 102 and/or the network can indicate different NB-IFOM support capabilities for each PDN connection. The UE 102 can indicate NB-IFOM support capabilities for some PDN connections and not for others, and similarly the network, via indications provided from the ePDG 212, can indicate NB-IFOM support for some PDN connections and not for others.

NB-IFOM Capability Negotiation

A negotiation between an initiator, e.g., the UE 102, and a responder, e.g., the ePDG 212 on behalf of the network, can include an exchange of IKEv2 messages to determine NB-IFOM capabilities and configurations. In some embodiments, when the UE 102 initiates the establishment of a PDN connection, e.g., as part of an initial attach and/or as a separate transaction, the UE 102 can indicate support for NB-IFOM for a particular PDN connection by including an NB-IFOM capability indication in a message to the ePDG 212, such as using an NB-IFOM_SUPPORT configuration attribute type (defined further herein) within a CFG_SET configuration payload included in an IKE_AUTH request. The UE 102 can also inquire of the network's support for NB-IFOM for a particular PDN connection, e.g., by including the NB-IFOM_SUPPORT configuration attribute type within a CFG_REQUEST configuration payload in an IKE_AUTH request sent to the ePDG 212.

The network can confirm an NB-IFOM capability, as provided by the UE 102 to the ePDG 212 in the CFG_SET configuration payload of the IKE_AUTH request, by having the ePDG 212 include the NB-IFOM_SUPPORT configuration attribute in a CFG_ACK configuration payload of an IKE_AUTH response sent to the UE 102. The network can also indicate support for NB-IFOM, in response to a query from the UE 102, by including the NB-IFOM_SUPPORT configuration attribute in a CFG_REPLY configuration payload of an IKE_AUTH response sent to the UE 102 (as an affirmative indication of NB-IFOM for a particular PDN connection). The IKE_AUTH response is sent by the ePDG 212 to the UE 102 in response to the IKE_AUTH request received from the UE 102 that included the NB-IFOM_SUPPORT configuration attribute type.

Routing Rules

Routing rules can be negotiated for both the 3GPP cellular access 206 and the non-3GPP IP access 208. A routing rule can provide a mapping of an IP flow to an access. A routing rule, in some embodiments, can include a routing filter with a routing address and a routing address type. (Routing filters can also be referred to as traffic selectors.) A routing filter can include a set of packet flow IP header parameter values (and/or ranges) that can be used to identify IP flows for routing purposes. For the 3GPP cellular access 206, the UE 102 can send routing rules via non-access stratum (NAS) signaling to a mobility management entity (MME) in the core network during an initial attach procedure, the UE requested PDN connectivity procedures, and the UE requested bearer resource modification procedures as defined in 3GPP TS 23.401. For the non-3GPP IP access 208, the UE 102 can send routing rules using IKEv2 signaling to the ePDG 212 during an initial attach procedure and the UE-initiated PDN connectivity procedures as defined in 3GPP TS 23.402. The NAS signaling for the 3GPP cellular access 206 and the IKEv2 signaling for the non-3GPP IP access 208 can be extended to carry routing rules associated with NB-IFOM as described herein.

For the 3GPP cellular access 206, the MME can send the routing rules to the serving gateway (S-GW) 210. The S-GW 210, to which the 3GPP cellular access 206 is communicatively coupled, and the ePDG 212, to which the non-3GPP IP access 208 is communicatively coupled, can send the routing rules to the PDN gateway 216 by means of a GTP protocol, e.g., using a GTP-based S5/S8 reference point. The S-GW 210 and the ePDG 212 can send the routing rules in a "Create Session Request" message to the PDN gateway 216.

In some embodiments, a default routing rule exists for any packets that do not match any of the routing rules. The UE 102 can provide a relative priority of the routing rules. The rule with the lowest priority can indicate a default route for packets, e.g., the default routing rule can be applied when no other routing rule applies to a packet. When the UE 102 performs an IP flow mobility procedure, the UE 102 can update the priority of a routing rule, change the routing access type of a particular routing rule, create new routing rules, and/or remove existing routing rules. Upon adding an access, the UE 102 can provide routing rules without a routing filter, thereby indicating that no traffic shall be routed on the newly added access. By adding the access in this manner, the UE 102 can prepare the new access for IP flow mobility, i.e., the UE 102 can speedily move traffic to the newly added access when need arises without waiting for a possibly length authentication process to complete for the new access at the time of the IP flow mobility procedure. In some embodiments, routing filters can be uni-directional and can be different for uplink traffic (UE 102 to PDN gateway 216) and for downlink traffic (PDN gateway 216 to UE 102). When a routing rule becomes valid, the routing rule can be applied, in some embodiments, to all IP flows including existing IP flows and future IP flows to be established. In some embodiments, when a routing rule becomes valid, the routing rule can be applied to future IP flows only.

FIG. 3A illustrates a representative table 300 that includes a set of routing rules and a representative format for a muting rule. Each routing rule can be identified by a rule identifier (ID) value and have a corresponding routing rule name. The rule ID value can be used to reference a particular IP flow rule that applies to a particular PDN connection. In some embodiments, the UE 102 and/or the ePDG 212, can reference the rule for a PDN connection by using the rule ID. The rule ID can be applicable for the particular PDN connection only, in some embodiments. Each routing rule can instruct to route IP flows filtered by a routing filter to a particular routing access type, e.g., to assign the IP flow to the 3GPP cellular access 206 or to the non-3GPP IP (WLAN) access 208. Each routing rule can include a rule priority value that can be updated to affect the priority of the routing rule. Routing rules can be applied in an order based on the priority rule. In some embodiments, a "default" routing rule can have a "lowest" priority level, such that at least one routing rule always applies, even when no other rules are assigned to an IP flow. In some embodiments, a default IP flow mobility routing rule is specified using a "wild card" traffic selector. The default routing rule may not contain any other traffic selectors, and the default routing rule can be used to indicate a default routing access type for any IP flows that do not have an explicit routing assignment, e.g., when no routing access type is assigned to an IP flow. Each muting rule can be designated as to what IP flows that routing rule applies when the routing rule becomes valid. For example, a muting rule can be applicable to existing IP flows and to future IP flows (e.g., in accordance with a "Yes" value in the "Applicable to Existing Flows" field, or another equivalent type of field, to indicate whether the rule applies to existing IP flows). A routing rule can also be applicable to future IP flows only (e.g., in accordance with a "No" value in the "Applicable to Existing Flows" field to indicate that the rule does not apply to existing IP flows). Thus a routing rule can apply to all IP flows of a PDN connection including existing IP flows and future, yet to be established IP flows. Alternatively, a routing rule can apply only to future IP flows and not to existing IP flows when the routing rule becomes valid. Thus, a routing rule that is not applicable to existing routing rules, may affect future IP flows but will not change the access type of existing IP flows that match the routing filter (traffic selector) criteria in the routing rule. Each routing rule can include a routing filter (traffic selector) that can be used to match IP flows against. The format of table 300 shown in FIG. 3A is representational only and includes a set of one or more parameters for each routing rule. The actual format of the table 300 can vary based on different implementations.

Additional IKEv2 Extensions

Figure 3B:
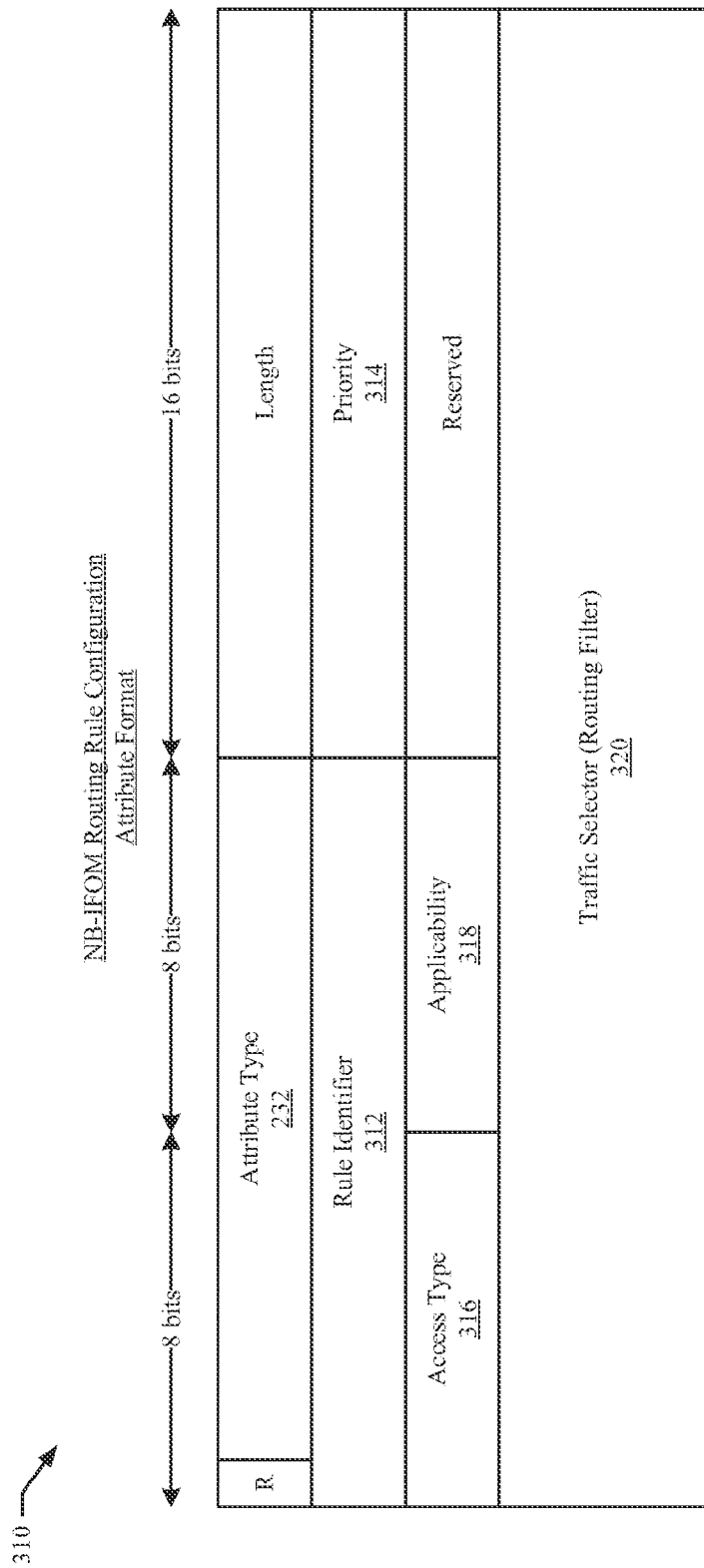
FIG. 3B illustrates a representative configuration attribute format for a network based Internet Protocol Flow Mobility (NB-IFOM) routing rule, in accordance with some embodiments.

FIG. 3B illustrates a representative format 310 for a configuration attribute that specifies a set of NB-IFOM routing rules applicable for IPv4 or IPv6 addresses. The configuration attribute format 310 illustrated in FIG. 3B is consistent with the generic configuration attribute format 230 illustrated in FIG. 2C.

A "reserved bit" indicated as "R" can be set to zero when sent and ignored with received, which is consistent with RFC 5996 of the IETF. The attribute type 232 can consist of fifteen bits that are reserved by the IANA to indicate an "NB-IFOM_ROUTING_RULES_IPv4" configuration attribute type (having a particular value assigned by the IANA and included in a table of IKEv2 parameters) or an "NB-IFOM_ROUTING_RULES_IPv6" configuration attribute type (having another particular value assigned by the IANA and included in the table of IKEv2 parameters). The length field of the NB-IFOM Routing Rules configuration attribute format 310 can be specified using sixteen bits (two octets), and a "zero" valued length can be possible as well as a variable length. The rule identifier field 312 can be specified by a sixteen bit unsigned integer value that includes a unique identifier for the rule. A value of "zero" can be reserved and not used. The rule identifier field 312 can correspond to the "Rule ID" shown in the table 300 of FIG. 3A, in some embodiments. A priority field 314 can be specified using a sixteen bit unsigned integer that includes a priority for the rule. The priority field 314 of FIG. 3B can correspond to the "Rule Priority" shown in the table 300 of FIG. 3A, in some embodiments. A lower number in the priority field 314 can indicate a lower priority, with a priority value of "one" reserved for a "default" IP flow mobility routing rule. A value of "zero" may be not used by the priority field 314 and can be reserved. The access type field 316 can indicate to which access the rule applies, e.g., to a 3GPP cellular access 206 or a non-3GPP IP access 208, such as a WLAN access. The access type field 316 of FIG. 3B can correspond to the "Routing Access Type" of FIG. 3A, in some embodiments. The applicability field 318 can be specified by an eight bit unsigned integer that indicates "applicability" information, e.g., whether the routing rule applies to all IP flows, such as both existing IP flows and future, yet to be established IP flows, or only to future IP flows. A first value can be used in the applicability field 318 to indicate all IP flows, while a second value can be used in the applicability field 318 to indicate a subset of IP flows, e.g., only future IP flows. In some embodiments, a value of "one" in the applicability field 318 can indicate that the rule applies to all IP flows, while a value of "two" can indicate that the rule only applies to future IP flows and does not change the access type of any matching, existing IP flows. The applicability field 318 of FIG. 3B can correspond to the "Applicable to Existing Flows" of FIG. 3A, in some embodiments. The traffic selector field 320 (which can also be referred to as a routing filter field) can be of variable length and can include a set of traffic selectors (routing filters), such as those defined in Section 3.1 (when using IPv4 addresses) and/or Section 3.2 (when using IPv6 addresses) of RFC 6088 specified by the IETF. The RFC 6088 document is incorporated by reference herein in its entirety for all purposes. The traffic selector field 320 of FIG. 3B can correspond to the "Routing Filter (Traffic Selector)" of FIG. 3A, in some embodiments.

IP Flow Mobility Routing Rules Negotiation

For communication via a non-3GPP IP access 208, which can be an untrusted WLAN access via an S2b reference point, a set of IP flow mobility routing rules that apply to a particular PDN connection can be negotiated by the UE 102 with the ePDG 212. In some embodiments, in the case of a UE-initiated network-based IP flow mobility process, the UE 102 sends an initial set of routing rules using IKEv2 signaling to the ePDG 212 during a UE-initiated PDN connectivity establishment procedure (e.g., as part of an initial attach procedure or as part of a separate transaction). The UE 102 can include a proposed set of routing rules by using a configuration attribute type assigned for communicating NB-IFOM routing rules, e.g., an NB-IFOM_ROUTING_RULES_IPv4 or NB-IFOM_ROUTING_RULES_IPv6 configuration attribute having a configuration attribute format 310 as shown in FIG. 3B. The NB-IFOM routing rules configuration attribute can be included in a CFG_REQUEST configuration payload of an IKE_AUTH request message send to the ePDG 212. In some embodiments, the UE 102 can provide a routing rule without a traffic selector (routing filter) field 320 to indicate that no traffic should be routed on the indicated access type 316, e.g., no traffic routed via the non-3GPP IP access 208 (such as a WLAN access) for a particular referenced PDN connection.

The ePDG 212 can respond to the UE 102 by including as set of routing rules that are accepted by the network, particularly by the PDN gateway 216, in an NB-IFOM_ROUTING_RULES_IPv4 configuration attribute or an NB-IFOM_ROUTING_RULES_IPv6 configuration attribute in a CFG_REPLY configuration payload of an IKE_AUTH response message sent back to the UE 102. The CFG_REQUEST configuration payload provided by the UE 102 and the CFG_REPLY configuration payload provided by the ePDG 212 permits the UE 102 to suggest an "initial" set of routing rules to the ePDG 212 (and thus to the network including the PDN gateway 216) and to receive a "modified" set of routing rules from the ePDG 212. In some embodiments, the ePDG 212 can send a set of routing rules that are modifications of those provided by the UE 102. In some embodiments, the ePDG 212 (on behalf of the network, e.g., for the PDN gateway 216) can alter the set of routing rules based on its own policy and return an "accepted" set of routing rules in the CFG_REPLY configuration payload of the IKE_AUTH response to the UE 102.

When the UE 102 intends to move one or more IP flows from one access to another access, e.g., from the 3GPP cellular access 206 to the non-3GPP IP access 208 or vice versa, the UE 102 can send an INFORMATIONAL request message to the ePDG 212. The INFORMATIONAL request message can include an updated set of routing rules as requested by the UE 102 and can use the format as described above to specify the updated set of routing rules, e.g., by including an NB-IFOM_ROUTING_RULES_IPv4 configuration attribute or an NB-IFOM_ROUTING_RULES_IPv6 configuration attribute in a CFG_REQUEST configuration payload of the INFORMATIONAL request message sent to the ePDG 212. In response, the ePDG 212 can include a set of "accepted" and/or "updated" routing rules that the network can accept, e.g., as indicated to the ePDG 212 by the PDN gateway 216. The set of "accepted" and/or "updated" routing rules from the ePDG 212 can be included in a CFG_REPLY configuration payload of an INFORMATIONAL response message sent to the UE 102 by using an NB-IFOM_ROUTING_RULES_IPv4 configuration attribute or an NB-IFOM_ROUTING_RULES_IPv6 configuration attribute.

In some embodiments, the UE 102 can initiate IP flow mobility routing rules negotiation as described hereinabove. In some embodiments, the network, e.g., via the ePDG 212, which can be in communication with the PDN gateway 216, can instead initiate IP flow mobility routing rules negotiation, i.e., a "network-initiated" NB-IFOM procedure can occur. In some embodiments, the IKEv2 procedures can require that the UE 102 indirectly start the "network-initiated" NB-IFOM procedure. For example, the UE 102 can initiate the "network-initiated" NB-IFOM procedure by including a "zero length" NB-IFOM_ROUTING_RULES_IPv4 configuration attribute or a "zero length" NB-IFOM_ROUTING_RULES_IPv6 configuration attribute in the CFG_REQUEST configuration payload of the IKE_AUTH request, thereby requesting that the ePDG 212 return a set of "initial" routing rules. The UE 102 can prompt the network-initiated NB-IFOM procedure as part of an initial attach procedure or as part of a separate transaction. In some embodiments, the PCRF 214 can create a set of initial routing rules for the network and provide them to the PDN gateway 216, which can in turn forward them to the ePDG 212 via the S2b reference point 218. The ePDG 212 can forward the initial set of routing rules to the UE 102 using an NB-IFOM_ROUTING_RULES_IPv4 configuration attribute or an NB-IFOM_ROUTING_RULES_IPv6 configuration attributed in a CFG_REPLY configuration payload of an IKE_AUTH response message sent to the UE 102. The UE 102 can accept implicitly the network provided routing rules (e.g., by not sending a modified set of routing rules in a subsequent IKE_AUTH response message).

In some embodiments, optionally, the UE 102 does not accept the network provided routing rules received in the IKE_AUTH response message and can seek to change the set of routing rules. The UE 102 can send a modified set of routing rules to the ePDG 212 by including an NB-IFOM_ROUTING_RULES_IPv4 configuration attribute or an NB-IFOM_ROUTING_RULES_IPv6 configuration attribute in a CFG_REQUEST configuration payload of a subsequent IKE_AUTH request message. The ePDG 212 can accept or modify the UE 102 suggested routing rules, e.g., by returning a modified set of routing rules accepted by the ePDG 212 (and thus also by the network, and particularly by the PDN gateway 216) by including an NB-IFOM_ROUTING_RULES_IPv4 configuration attribute or an NB-IFOM_ROUTING_RULES_IPv6 configuration attribute in a CFG_REPLY configuration payload of an IKE_AUTH response message sent to the UE 102.

When the network intends to move one or more IP flows, e.g., between the 3GPP cellular access 206 and the non-3GPP IP access 208 (e.g., a WLAN access), the ePDG 212 can send an INFORMATIONAL request message to the UE 102. The INFORMATIONAL request message can include an updated set of routing rules by including an NB-IFOM_ROUTING_RULES_IPv4 configuration attribute or an NB-IFOM_ROUTING_RULES_IPv6 configuration attribute in a CFG_REQUEST configuration payload of the INFORMATIONAL request message sent to the UE 102. The UE 102 can respond to the INFORMATIONAL request message from the ePDG 212 by including a set of "accepted" routing rules using an NB-IFOM_ROUTING_RULES_IPv4 configuration attribute or an NB-IFOM_ROUTING_RULES_IPv6 configuration attribute in a CFG_REPLY configuration payload of an INFORMATIONAL message send back to the ePDG 212.

IP Flow Mobility Procedures

The UE 102 can request to move an IP flow from a source access, e.g., the 3GPP cellular access 206 or the non-3GPP IP access 208, to a target access, e.g., the non-3GPP IP access 208 or the cellular access 206, by sending a request. In some embodiments, the UE 102 can preferably send the request for moving one or more IP flows to the target access.

In some embodiments, the UE 102 can decide to which access to send the request on. By sending the request on the target access, the UE 102 can avoid (or at least minimize the probability of) losing signaling when radio conditions via the source access degrade (e.g., weak signals from a WLAN access) or when control plane congestion and traffic occurs via the source access (e.g., moving from a congested and/or overloaded cellular access to a WLAN access).

System Impacts

The UE 102 can be enhanced to send routing rules by using NAS signaling. The UE 102 can also be enhanced to send routing rules by using IKEv2 signaling. The UE 102 can be enhanced to indicate support for NB-IFOM using PCO included in NAS messages and IKEv2 signaling to the PDN gateway 216. The UE 102 can be enhanced to send an "Attach Request" message including a "Request Type" that provides an NB-IFOM indication request type to the mobility management entity (MME). The UE 102 can be modified to route one or more IP flow(s) to the PDN gateway 216 (i.e., in the uplink direction) by referring to a routing access type part of a set of routing rules. A mobility management entity (MME) can be enhanced to transport routing rules received from a UE 102 via NAS signaling to the serving gateway 210. The serving gateway 210 can be modified to transport routing rules sent from the MME to the PDN gateway 216. The ePDG 212 can be enhanced to transport NB-IFOM support indication(s) and/or routing rules received from the UE 102 via IKEv2 signaling to the PDN gateway 216.

The PDN gateway 216 can be modified to support NB-IFOM as follows. The PDN gateway 216 can be modified to support negotiation by using PCO for the support of NB-IFOM during an initial attach of the UE 102 and UE requested PDN connectivity procedures. The PDN gateway 216 can be modified to keep GTP tunnels to both the serving gateway 210 and the ePDG 212 simultaneously in order to enable NB-IFOM mobility procedures. The PDN gateway 216 can be modified to route one or more IP flows(s) to the UE 102 (i.e., in the downlink direction) by referring to a routing access type part of a set of routing rules.

Enhancements to a policy and charging control (PCC) function, e.g., as implemented in a policy and charging rules (PCRF) function 214, can include the following. The PCC can be enhanced to support NB-IFOM by extending IP Connectivity Access Network (IP-CAN) Gx signaling to indicate a service data flow (SDF) specific routing access type instead of an IP-CAN session specific routing access type. The PCRF 214 can be enhanced to support NB-IFOM by including logic to associate multiple Gxx sessions with a single Gx session, based on the SDF specific routing access type exchanged over Gx. The PCRF 214 can be further enhanced to support receiving updates from the PDN gateway 216 regarding a current routing access type for each IP flow and also corresponding new and updated routing rules via Gx signaling for a GTP-based S5/S8 reference point. In some embodiments, enhancements to PCC to support S2b-based IP flow mobility can be achieved by redefining established PCC procedures that support S2c-based IP flow mobility, e.g., by replacing routing address with routing address type.

Signaling Flows: Initial PDN Connection Establishment Over 3GPP Cellular Access

The UE 102 can perform an initial attach and PDN connection establishment over a 3GPP cellular access 206 as specified in 3GPP TS 23.401 clause 5.3.2 with the following additions. When the UE 102 supports NB-IFOM, the UE 102 can indicate support for NB-IFOM to the PDN gateway 216 in the PCO of an "Attach Request" message. The UE 102 can also include a set of initial routing rules in the "Attach Request" message with a routing access type set to indicate 3GPP cellular access. A packet filter traffic flow template (TFT) can be extended to carry the routing rules, in some embodiments. The MME can include routing rules in a "Create Session Request" message sent to the serving gateway 210. The serving gateway 210 can forward routing rules included in the "Create Session Request" message to the PDN gateway 216. In some embodiments, the routing address for 3GPP cellular access can be the IP address of the serving gateway 210. The PDN gateway 216 can initiate an IP-CAN session establishment procedure with the PCRF 214. The PCRF 214 can modify the routing rules for communication in the downlink direction (PDN gateway 216 to UE 102) and/or in the uplink direction (UE 102 to PDN gateway 216) and can send the modified routing rules to the PDN gateway 216. When the PDN gateway 216 supports NB-IFOM, a "Create Session Response" message can include an indication in the PCO. The PDN gateway 216 can send the "Create Session Response" message to the serving gateway 210 including a set of "accepted" routing rules. The serving gateway 210 can send a "Create Session Response" message that includes the "accepted" routing rules to the MME, and the MME can forward the "accepted" routing rules to the UE 102 in an "Attach Accept" message.

Signaling Flows: Initial PDN Connection Establishment Over Non-3GPP IP Access

Initial PDN connection establishment procedures over non-3GPP IP access 208 (e.g., WLAN access) can follow procedures as described in clause 7.2.4 of 3GPP TS 23.402 with the following additions. The UE 102 can discover a WLAN (or other non-3GPP wireless access network) and may perform an authentication and authorization procedure with the 3GPP enhanced packet core (EPC) via the non-3GPP IP access 208. IKEv2 authentication and tunnel setup procedures can be performed via the non-3GPP IP access 208 between the UE 102, the ePDG 212, and 3GPP authentication, authorization, and accounting (AAA) server and/or home subscriber server (HSS) as described in 3GPP TS 33.402, which is incorporated by reference herein in its entirety for all purposes. When the UE 102 supports NB-IFOM, the UE 102 can indicate support for NB-IFOM to the ePDG 212 in an IKE_AUTH request. The UE 102 can also include a set of initial routing rules in the traffic selector of the IKE_AUTH request with the routing access type set to WLAN. The ePDG 212 can include the routing rules in a "Create Session Request" message sent to the PDN gateway 216. A packet filter (TFT) can be extended to carry the routing rules. When dynamic PCC functions are supported, the PDN gateway 216 can initiate an IP-CAN Session Establishment procedure with the PCRF 214. In the request, when the PDN gateway 216 supports NB-IFOM, the PDN gateway 216 can send the routing rules to the PCRF 214. The PCRF 214 can modify the routing rules for communication in the downlink direction (PDN gateway 216 to UE 102) and/or in the uplink direction (UE 102 to PDN gateway 216). The PCRF 214 can send the modified routing rules to the PDN gateway 216. When the PDN gateway 216 supports NB-IFOM, a "Create Session Response" message can contain an indication in the PCO. The PDN gateway 216 can send the "Create Session Response" message to the ePDG 212 including a set of "accepted" routing rules, e.g., as determined by the PCRF 214. The ePDG 212 can send an IKE_AUTH response message to the UE 102 including an indication that the PDN gateway 216 supports NB-IFOM and traffic selector that carries the set of "accepted" routing rules, e.g., as determined by the PCRF 214.

Signaling Flows: Addition of a Non-3GPP IP Access to a PDN Connection

Figure 4:
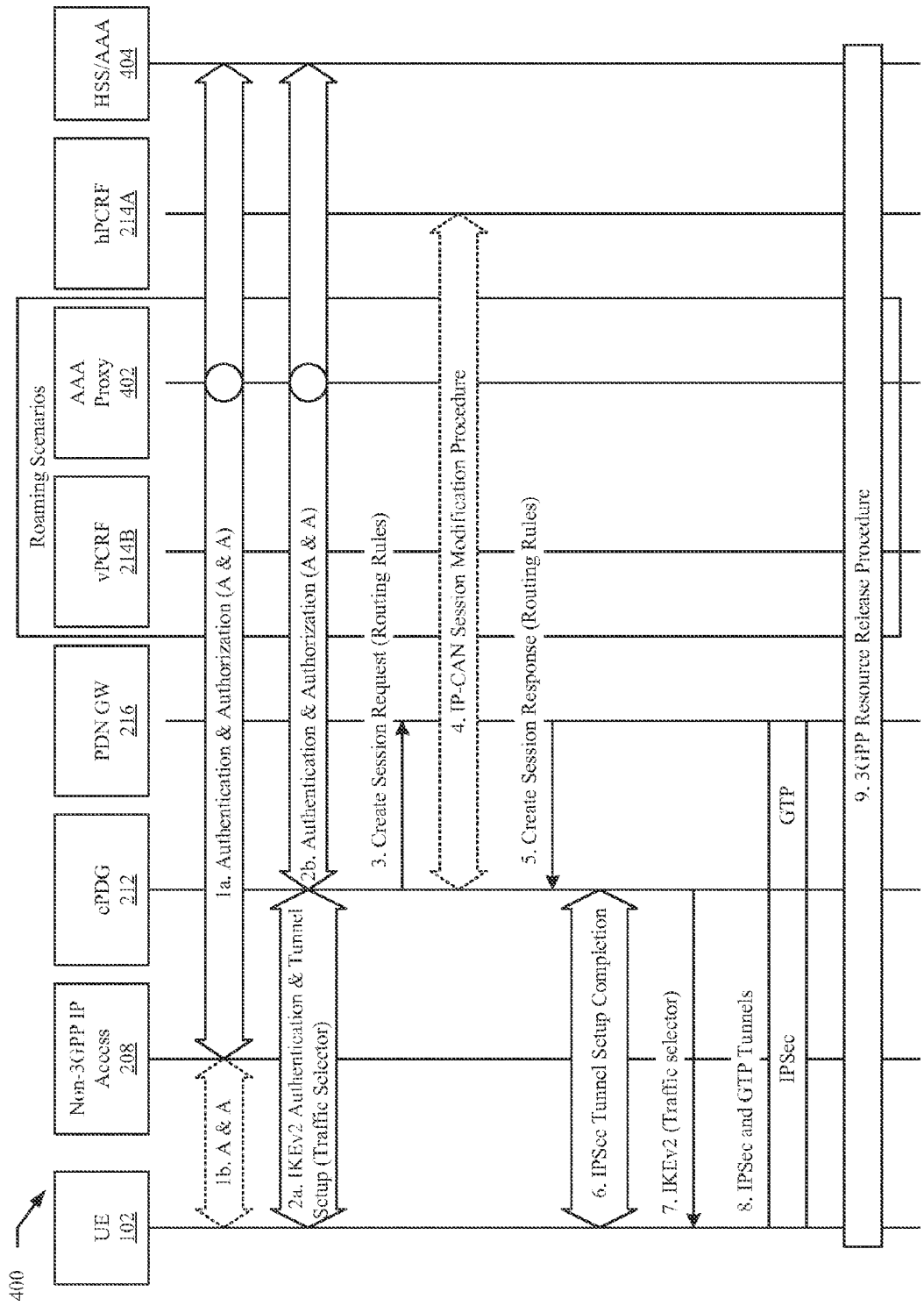
FIG. 4 illustrates a procedure to add a wireless local area network (WLAN) access to an existing packet data network (PDN) connection established through a cellular wireless access network, in accordance with some embodiments.

FIG. 4 illustrates a message exchange sequence 400 to add a non-3GPP IP access 208 (e.g., WLAN access) to an established PDN connection. After the UE 102 has successfully attached to the 3GPP cellular access 206 and has established a PDN connection over the 3GPP cellular access 206, e.g., using GTP as described hereinabove, a non-3GPP IP access 208 can be added to the established PDN connection. The UE 102 can perform a non-3GPP IP access attachment, e.g., a WLAN attachment, and can request to establish a PDN connection using the same access point name (APN) as already used for the established PDN connection via the 3GPP cellular access 206. The UE 102 can attempt to use both the 3GPP cellular access 206 and the non-3GPP IP access 208 for the same PDN connection simultaneously. As shown in FIG. 4, the UE 102 can be first connected to the 3GPP cellular access 206 and can subsequently request addition of a non-3GPP IP access (e.g., a WLAN access). In step 1a, the UE 102 can discover the non-3GPP IP access 208 and can perform an authentication and authorization (A & A) procedure with the 3GPP EPC via the non-3GPP IP access 208, e.g., as specified in 3GPP TS 23.402, clause 7.2.1, clause 1. In some embodiments, the UE 102 can also perform an A&A procedure with the non-3GPP IP access 208, as indicated by step 1b (which can occur before step 1a). In steps 2a and 2b, the UE 102 can perform an IKEv2 authentication and tunnel setup procedure via the non-3GPP IP access 208 with the ePDG 212 and with the 3GPP AAA server and home subscription server (HSS/AAA) 404, e.g., as specified in 3GPP TS 33.402. The UE 102 can include a set of routing rules in the traffic selector of an IKE_AUTH request message. For IP address preservation, the UE 102 can include its own IP address (e.g., an IPv4 address or an IPv6 prefix/address or both), which have been allocated during a preceding attachment procedure that connected the UE 102 to the 3GPP cellular access 206, in a CFG_REQUEST message sent to the ePDG 212 during an IKEv2 message exchange. The UE 102 can provide routing rules without a routing filter, in some embodiments, thereby indicating that no traffic is to be routed via the non-3GPP IP access 208.

In step 3, the ePDG 212 can include the routing rules (e.g., received from the UE 102) and an NB-IFOM indication in a "Create Session Request" message sent to the PDN gateway 216. A packet filter traffic flow template (TFT) can be extended to carry the routing rules. In step 4, based on the presence of the NB-IFOM indication in the "Create Session Request" message, the PDN gateway 216 can allocate the same IP address for the UE 102 as for the PDN connection that the UE 102 established over the 3GPP cellular access 206. The PDN gateway 216 can also establish a new GTP tunnel with the ePDG 212 while maintaining the previous GTP tunnel with the serving gateway 210 when valid routing rules exist for the 3GPP cellular access 206. When dynamic PCC is supported, the PDN gateway 216 can initiate an IP-CAN Session Modification procedure with the PCRF 214. (As indicated in FIG. 4, in some embodiments, the UE 102 can be connected via 3GPP cellular access 206 for a "home" wireless network, in which case the "home" PCRF (hPCRF) 214A can participate in the procedures described. As also indicated in FIG. 4, the UE 102 can be connected via 3GPP cellular access 206 for a "visited" wireless network in a roaming scenario, in which case both the "visited" PCRF (vPCRF) 214B and the "home" PCRF (hPCRF) 214A can participate in the procedures described, and the communication is via an AAA proxy 402.) The PDN gateway 216 can send the routing rules to the PCRF 214. The PCRF 214 can modify the routing rules for communication in the downlink direction (UE 102 to PDN gateway 216) and/or the uplink direction (PDN gateway 216 to UE 102), and the PCRF 214 can send the modified routing rules to the PDN gateway 216.

In step 5, the PDN gateway 216 can record the routing rules in a bearer context table, e.g. in storage associated with the PDN gateway 216. The PDN gateway 216 can link one or more IP flows established over the non-3GPP IP access 208 to one or more IP flows established over the 3GPP cellular access 206, e.g., by using the same entry in an EPS bearer context table, or by creating a new entry in the EPS bearer context table and linking the two entries. The PDN gateway 216 can send a "Create Session Response" message to the ePDG 212 that includes a set of "accepted" routing rules, e.g., as determined by the PCRF 214. In step 6, the ePDG 212 can indicate to the UE 102 that the authentication and authorization procedure with the external AAA server (e.g., HSS/AAA 404) is successful. In step 7, the ePDG 212 can determine a traffic selector to be sent to the UE 102 based on the routing rules included in the "Create Session Response" message. The ePDG 212 can send an IKE_AUTH response message to the UE 102 including the traffic selector that carries the routing filter accepted by the PDN gateway 216.

In step 8, IP connectivity between the UE 102 and the PDN gateway 216 can be completed. Any packet communicated in the uplink direction (UE 102 to the PDN gateway 216) complying with the traffic selector can be tunneled to the ePDG 212 by the UE 102 using an IPSec tunnel. The ePDG 212 can tunnel the packet(s) to the PDN gateway 216, e.g., using GTP. From the PDN gateway 216 a "normal" IP-based routing can occur. In the downlink direction (PDN gateway to UE 102), a packet for the UE 102 can arrive at the PDN gateway 216. The PDN gateway 216 can tunnel the packet to the ePDG 212 based on the routing rules. The ePDG can then tunnel the packet to the UE 102 via a proper IPsec tunnel.

In step 9, applicable 3GPP resource release procedures can be executed for any resources associated with IP flows that moved from the 3GPP cellular access 206 to the non-3GPP IP access 208, e.g., using processes as specified in 3GPP TS 23.402.

Signaling Flows: Addition of a 3GPP Cellular Access to a PDN Connection

The UE 102 can, in some embodiments, exchange a sequence of messages to add a 3GPP cellular access 206 to an established PDN connection. After the UE has successfully attached to a non-3GPP IP access 208 (e.g., a WLAN access) and has established a PDN connection over the non-3GPP IP access 208, e.g., using GTP as described hereinabove, a 3GPP cellular access 206 can be added to the established PDN connection. The UE 102 can perform an initial attach procedure over the 3GPP cellular access 206 and request to establish a PDN connection using the same APN as already used for the established PDN connection via the non-3GPP IP access 208. The UE 102 can follow a procedure as specified in 3GPP TS 23.401, clause 5.3.2 with the following additions.

The UE can send an "Attach Request" message to the MME with a request type that indicates an NB-IFOM attach. The UE 102 can include a set of routing rules in the "Attach Request" message. A packet filter TFT can be extended to carry the routing rules, in some embodiments. The UE 102 can provide routing rules without a routing filter, in some embodiments, thereby indicating that no traffic is to be routed on the 3GPP cellular access 206. The MME can include the routing rules and an NB-IFOM indication in a "Create Session Request" message sent to the serving gateway 210. The serving gateway 210 can forward the "Create Session Request" message to the PDN gateway 216. The routing address for the 3GPP cellular access 206 can be the IP address of the serving gateway 210.

Based on the inclusion of an NB-IFOM indication in the "Create Session Request" message, the PDN gateway 216 can allocate the same IP address for the UE 102 as for the PDN connection that the UE 102 established over the non-3GPP IP access 208. The PDN gateway 216 can establish a new GTP tunnel with the serving gateway 210 while maintaining the previously established GTP tunnel with the ePDG 212, when valid routing rules exist for the non-3GPP IP access 208. The PDN gateway 216 can initiate an IP-CAN Session Modification procedure with the PCRF 214. (As described hereinabove, in some embodiments, the UE 102 can be connected via 3GPP cellular access 206 for a "home" wireless network, in which case the "home" PCRF (hPCRF) 214A can participate in the procedures described. The UE 102 can be connected via 3GPP access 206 for a "visited" wireless network in a roaming scenario, in which case both the "visited" PCRF (vPCRF) 214B and the "home" PCRF (hPCRF) 214A can participate in the procedures described, and the communication is via an AAA proxy 402.) The PCRF 214 can modify the routing rules for communication in the downlink direction (PDN gateway 216 to the UE 102) and/or for communication in the uplink direction (UE 102 to the PDN gateway 216). The PCRF 214 can send the modified routing rules to the PDN gateway 216.

The PDN gateway 216 can record, e.g., in associated storage, the routing rules in a bearer context table. The PDN gateway 216 can link one or more IP flows established over the 3GPP cellular access 206 with one or more IP flows of the same PDN connection established over the non-3GPP IP access 208, e.g., by using the same entry in the EPS bearer context table, or by creating a new entry in the EPS bearer context table and linking the two entries. The PDN gateway 216 can send a "Create Session Response" message to the serving gateway 210 that includes routing rules accepted by the PDN gateway 216. The serving gateway 210 can send a "Create Session Response" message that includes the accepted routing rules to the MME, and the MME can forward the accepted routing rules to the UE 102 in an "Attach Accept" message. Applicable 3GPP bearer setup and/or modification procedures can be executed for resources associated with IP flows that are moved from the non-3GPP IP access 208 to the 3GPP cellular access 206.

Figure 5:
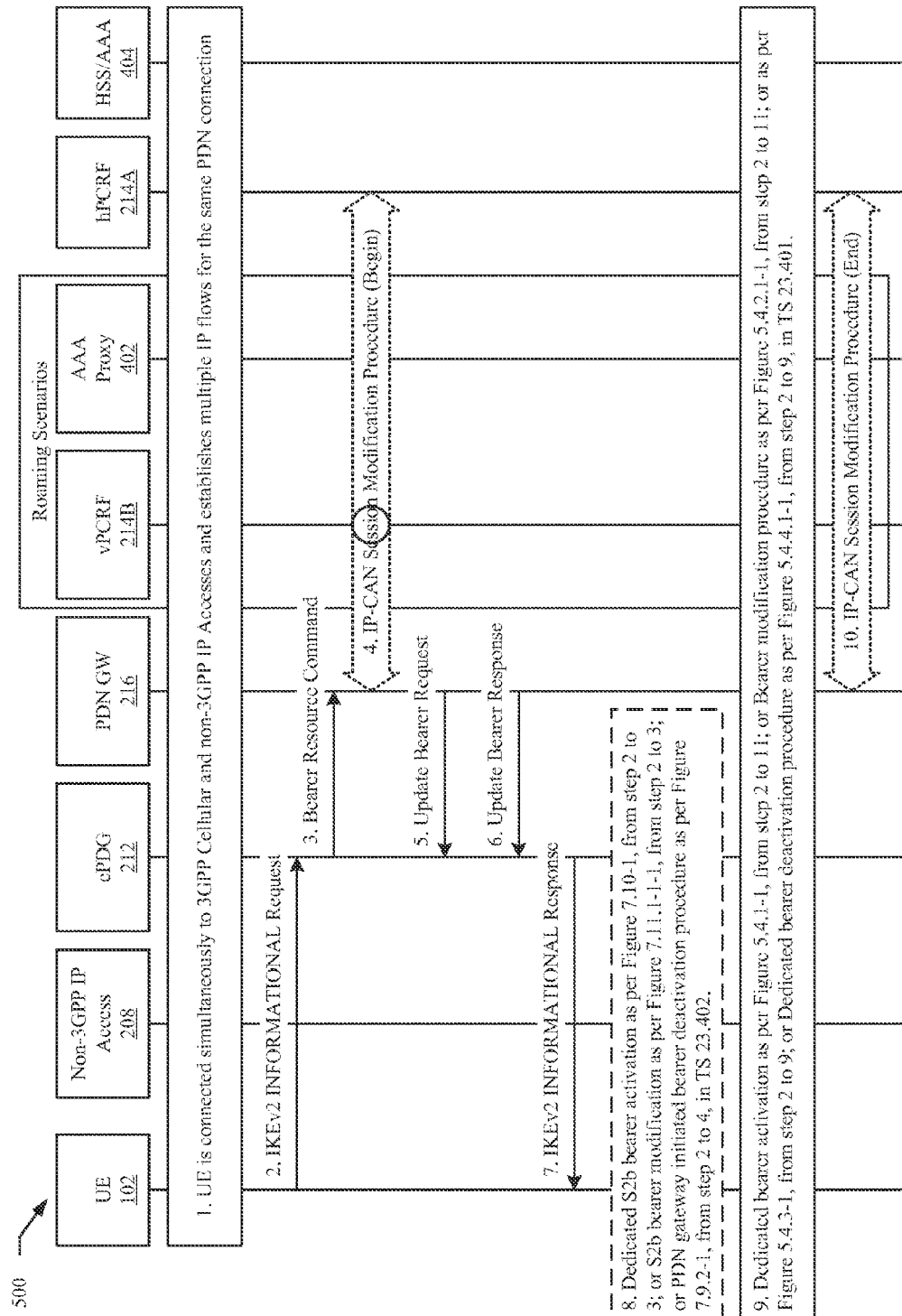
FIG. 5 illustrates a procedure to move one or more IP flows from a cellular wireless access network to a WLAN access, in accordance with some embodiments.

Signaling Flows: IP Flow Mobility within a PDN Connection with UE-Initiated Resource Request to Move from 3GPP Cellular Access to Non-3GPP IP Access FIG. 5 illustrates a message exchange sequence 500 for a process, initiated by the UE 102, to move one or more IP flow(s) from the 3GPP cellular access 206 to the non-3GPP IP access 208. The UE 102 can update a set of routing rules via the non-3GPP IP access 208, in some embodiments. In step 1, the UE 102 can be connected simultaneously to the 3GPP cellular access 206 and the non-3GPP IP access 208 and can establish multiple IP flows for the same PDN connection, as described hereinabove. In step 2, the UE 102 can send an IKEv2 INFORMATIONAL request message to the ePDG 212, the request including a set of updated routing rules as request by the UE 102. In step 3, the ePDG 212 can send a "Bearer Resource Command" message to the PDN gateway 216. The "Bearer Resource Command" message can include the updated requested routing rules. The ePDG 212 can include a default EPS bearer ID (e.g., a "Linked Bearer" ID) based on a mapping between a "Security Association" and the PDN connection.

In step 4, the PDN gateway 216 can initiate an IP-CAN "Session Modification" procedure with the PCRF 214. (As described hereinabove, in some embodiments, the UE 102 can be connected via 3GPP cellular access 206 for a "home" wireless network, in which case the "home" PCRF (hPCRF) 214A can participate in the procedures described. The UE 102 can be connected via 3GPP access 206 for a "visited" wireless network in a roaming scenario, in which case both the "visited" PCRF (vPCRF) 214B and the "home" PCRF (hPCRF) 214A can participate in the procedures described, and the communication is via an AAA proxy 402.) In a request as part of the IP-CAN "Session Modification" procedure, the PDN gateway 216 can provide the updated requested routing rules to the PCRF 214. In step 5, the PDN gateway 216 sends an "Update Bearer Request" message to the ePDG 212, including in the message a set of "accepted" routing rules. In step 6, the ePDG 212 sends an "Update Bearer Response" message to the PDN gateway 216. In step 7, the ePDG 212 sends an IKEv2 INFORMATIONAL response message to the UE 102 including a traffic selector that carries the "accepted" routing rules as provided by the PDN gateway 216.

In step 8, applicable non-3GPP IP (e.g., WLAN) resource allocation procedures can be executed for resources associated with one or more IP flows modified and/or added to the non-3GPP IP access 208. In some embodiments, step 8 includes dedicated S2b bearer activation as per FIGS. 7.10-1, from step 2 to 3; or S2b bearer modification as per FIG. 7.11.1-1-1, from step 2 to 3; or PDN gateway 216 initiated bearer deactivation procedure as per FIG. 7.9.2-1, from step 2 to 4, as described in 3GPP TS 23.402.

In step 9, applicable 3GPP cellular resource release procedures can be executed for resources associated with one or more IP flows modified and/or removed from the 3GPP cellular access 206. In some embodiments, step 9 includes dedicated bearer activation as per FIG. 5.4.1-1, from step 2 to 11; or bearer modification procedure as per FIG. 5.4.2.1-1, from step 2 to 11; or as per FIG. 5.4.3-1, from step 2 to 9, or dedicated bearer deactivation procedure as per FIG. 5.4.4.1-1, from step 2 to 9, as described in 3GPP TS 23.401.

In step 10, the PDN gateway 216 can indicate to the PCRF 214 whether the PCC decision could be enforced or not.

Figure 6:
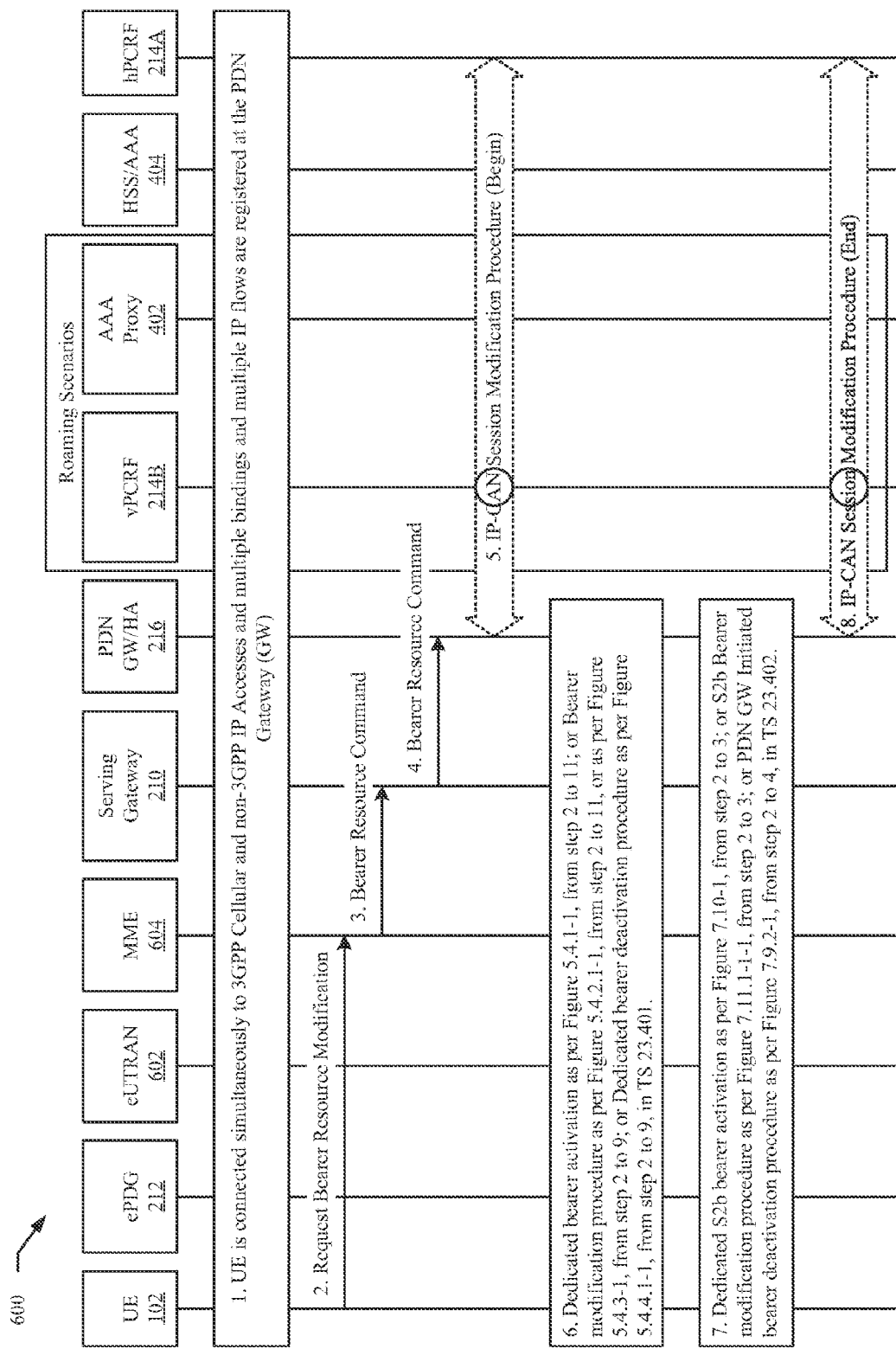
FIG. 6 illustrates a procedure to move one or more IP flows from a WLAN access to a cellular wireless access network, in accordance with some embodiments.

Signaling Flows: IP Flow Mobility within a PDN Connection with UE-Initiated Resource Request to Move from Non-3GPP IP Access to 3GPP Cellular Access FIG. 6 illustrates a message sequence 600 for a process, initiated by the UE 102, to move one or more IP flow(s) from the non-3GPP IP access 208 to the 3GPP cellular access 206. The UE 102 can update a set of routing rules via the 3GPP cellular access 206, in some embodiments. In step 1, the UE 102 can be connected simultaneously to the 3GPP cellular access 206 and the non-3GPP IP access 208 and can establish multiple IP flows for the same PDN connection, as described hereinabove. Multiple bindings and multiple IP flows can be registered at the PDN gateway 216. In step 2, the UE 102 can include a set of updated routing rules in a "Request Bearer Resource Modification" message sent to the MME 604. In some embodiments, packet filter(s) with packet filter identifier(s) and changed packet filter information can be extended to indicate the modified routing rules. In step 3, the MME 604 sends a "Bearer Resource Command" message that includes the updated routing rules to the serving gateway 210.

In step 4, the serving gateway 210 sends the "Bearer Resource Command" message that includes the updated routing rules to the PDN gateway 216. In some embodiments, the routing address for the 3GPP cellular access 206 is the serving gateway 210 IP address. In step 5, the PDN gateway 216 initiates an IP-CAN "Session Modification" procedure and provides a set of updated routing rules to the PCRF 214. (As described herein, in some embodiments, the UE 102 can be connected via 3GPP cellular access 206 for a "home" wireless network, in which case the "home" PCRF (hPCRF) 214A can participate in the procedures described. The UE 102 can be connected via 3GPP access 206 for a "visited" wireless network in a roaming scenario, in which case both the "visited" PCRF (vPCRF) 214B and the "home" PCRF (hPCRF) 214A can participate in the procedures described, and the communication is via an AAA proxy 402.) The PCRF 214 can store the updated routing rules and can update a set of PCC rules based on the updated routing rules. The PCRF 214 can send an acknowledgement to the PDN gateway 216 including a set of updated PCC rules, when applicable.

In step 6, applicable 3GPP resource allocation procedures can be executed for resources associated with one or more IP flows modified and/or added to the 3GPP cellular access 206. In some embodiments, step 6 can include dedicated bearer activation as per FIG. 5.4.1-1, from step 2 to 11; or bearer modification procedure as per FIG. 5.4.2.1-1, from step 2 to 11, or as per FIG. 5.4.3-1, from step 2 to 9; or dedicated bearer deactivation procedure as per FIG. 5.4.4.1-1, from step 2 to 9, as described in 3GPP TS 23.401.

In step 7, applicable non-3GPP IP (e.g., WLAN) resource allocation procedures can be executed for resources associated with one or more IP flows modified and/or removed from the non-3GPP IP access 208. In some embodiments, step 7 includes dedicated S2b bearer activation as per FIGS. 7.10-1, from step 2 to 3; or S2b bearer modification procedure as per FIG. 7.11.1-1-1, from step 2 to 3; or PDN gateway 216 initiated bearer deactivation procedure as per FIG. 7.9.2-1, from step 2 to 4, as described in 3GPP TS 23.402.

In step 8, the PDN gateway 216 can indicate to the PCRF 214 whether the PCC decision could be enforced or not.

Removal of an Access from a PDN Connection

When the UE 102 disconnects from the non-3GPP IP access 208 and remains connected only to the 3GPP cellular access 206, a procedure can be executed, e.g., as described in 3GPP TS 23.402, clause 7.4.3. When the UE 102 disconnects from the 3GPP cellular access 206 and remains connected only to the non-3GPP IP access 208, a procedure can be executed, e.g., as described in 3GPP TS 23.401, sub-clause 5.3.8.2. When the UE 102 seeks to preserve one or IP flows from an access to be detached from, a procedure can be performed as specified hereinabove for moving the one or more IP flows from one access to another access before the UE 102 detaches from the "old" access. In some embodiments, optional steps 4 and 10 in FIG. 5 and optional steps 5 and 8 in FIG. 6, which include interaction steps between the PDN gateway 216 and the PCRF 214 can occur only when dynamic policy provisioning is deployed in the EPC.

Addition of an Access for Multiple PDN Connections to the Same APN

When the UE 102 has multiple PDN connections to the same APN through one access and then attaches to a second access, the UE 102 can determine which of the multiple PDN connections to use by both accesses simultaneously.

When the UE 102 has multiple PDN connections to the same APN through the 3GPP cellular access 206 and then attaches to the non-3GPP IP access 208, the UE 102 can perform NB-IFOM procedures only for PDN connections that are subject to IP flow mobility.

When the UE 102 has multiple PDN connections to the same APN through the non-3GPP IP access 208 and then attaches to the 3GPP cellular access 206, the UE 102 can perform NB-IFOM procedures only for PDN connections that are subject to IP flow mobility.

In some embodiments, the UE 102 can be unable to refer to a particular PDN connection, and thus, the UE 102 can repeat the UE requested PDN connectivity procedure until a one or more desired PDN connections are established and perform NB-IFOM procedures for the one or more desired PDN connections.

Figure 7:
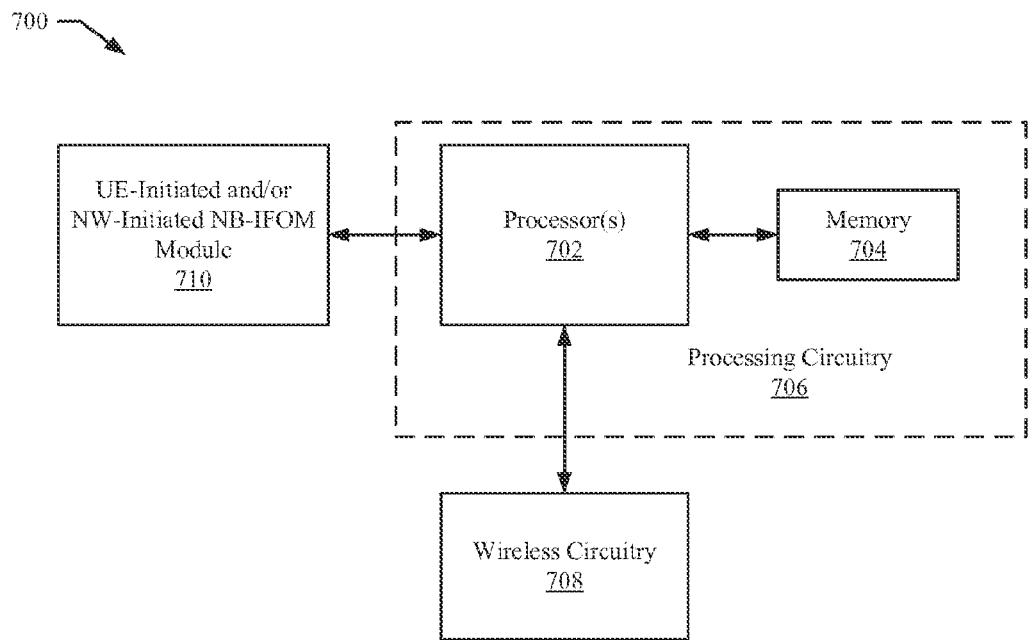
FIG. 7 illustrates a block diagram of an apparatus that can be implemented on a wireless communication device to support network-based IP flow mobility, in accordance with some embodiments.

FIG. 7 illustrates a diagram 700 of components of a wireless communication device, such as UE 102, including one or more processor(s) 702 coupled to memory 704, which together can be referred to as processing circuitry 706, wireless circuitry 708 that provides for wireless radio frequency (RF) connections between the UE 102 and various wireless networks, e.g., the 3GPP cellular access 206 using the cellular wireless circuitry 104A and/or the non-3GPP IP access 208 using the non-cellular wireless circuitry 104B. The UE 102 can also include a NB-IFOM module 710 configurable to operate together with the processing circuitry 706 and the wireless circuitry 708 to perform one or more operations for the UE 102 as described herein to realize a UE-initiated network-based IP flow mobility process and/or a NW-initiated network-based IP flow mobility process. In some embodiments, the wireless circuitry 708 includes one or more baseband processor(s), and a set of RF analog front-end circuitry. In some embodiments, the wireless circuitry 708 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 708 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless networks.

The processor(s) 702 and the wireless circuitry 708 can be configured to perform and/or control performance of one or more functionalities of the UE 102, in accordance with various implementations. The processor(s) 702 and the wireless circuitry 708 can provide functionality for managing IP flow mobility for the UE 102. The processor(s) 702 may include multiple processors of different types that can provide for both wireless communication management and/or higher layer functions, e.g., one or more of the processor(s) 702 may be configured to perform data processing, application execution, and/or other device functions according to one or more embodiments of the disclosure. The UE 102, or portions or components thereof, such as processor(s) 702, can include one or more chipsets, which can respectively include any number of coupled microchips thereon.

In some embodiments, the processor(s) 702 may be configured in a variety of different forms. For example, the processor(s) 702 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 702 of the UE 102 can be coupled to and/or configured in operative communication with each other, and these components may be collectively configured to perform IP flow mobility management functions via multiple wireless networks. In some implementations, the processor(s) 702 can be configured to execute instructions that may be stored in memory 704, or that can otherwise be accessible to the processor(s) 702 in some other device memory. As such, whether configured as, or in conjunction with, hardware or a combination of hardware and software, the processor(s) 702 may be capable of performing operations according to various implementations described herein, when configured accordingly. In various embodiments, memory 704 in the UE 102 may include multiple memory devices that can be associated with any common volatile or non-volatile memory type. In some scenarios, the memory 704 may be associated with a non-transitory computer-readable storage medium that can store various computer program instructions, which may be executed by the processor(s) 702 during normal program executions. In this regard, the memory 704 can be configured to store information, data, applications, instructions, or the like, for enabling the UE 102 to carry out various functions in accordance with one or more embodiments of the disclosure. In some implementations, the memory 704 may be in communication with, and/or otherwise coupled to, the processor(s) 702, as well as one or more system buses for passing information between and amongst the different device components of the UE 102.

It should be appreciated that not all of the components, device elements, and hardware illustrated in and described with respect to the UE 102 shown in FIG. 7 may be essential to this disclosure, and thus, some of these items may be omitted, consolidated, or otherwise modified within reason. Additionally, in some implementations, the subject matter associated with the UE 102 can be configured to include additional or substitute components, device elements, or hardware, beyond those depicted within the illustration of FIG. 7.

Figure 8:
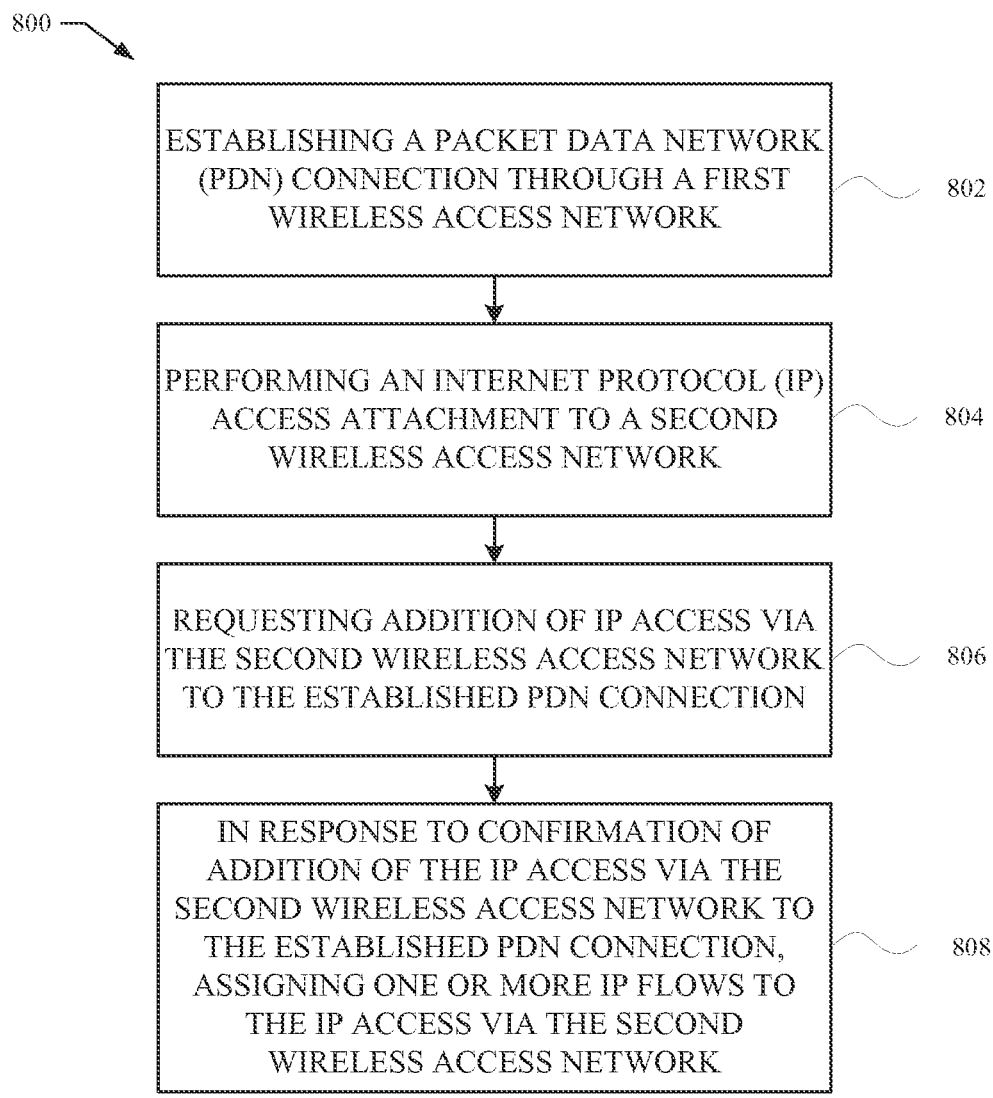
FIG. 8 illustrates a method to manage IP flow mobility for a wireless communication device, in accordance with some embodiments.

FIG. 8 illustrates a representative method 800 to manage IP flow mobility for a wireless device implemented at the wireless device, at least in part. In step 802, the wireless device establishes a packet data network (PDN) connection via a first wireless access network. In step 804, the wireless device performs an IP access attachment via a second wireless access network. In step 806, the wireless device requests to add the IP access via the second wireless access network to the established PDN connection already in use through the first wireless access network. In step 808, the wireless device, in response to receipt of a confirmation of the addition of the IP access via the second wireless access network to the established PDN connection, assigns one or more IP flows to the IP access via the second wireless access network. In some embodiments, the first wireless access network includes a cellular wireless access network, and the second wireless access network includes a wireless local area network (WLAN). In some embodiments, the wireless device sends to the cellular wireless access network one or more non-access stratum (NAS) messages that include Protocol Configuration Options (PCO) and that indicate support for network-based IP flow mobility (NB-IFOM). In some embodiments, the first wireless access network includes a wireless local area network (WLAN), and the second wireless access network includes a cellular wireless access network. In some embodiments, the wireless device sends to the WLAN an Internet Key Exchange Version 2 (IKEv2) protocol signaling message that indicates support for NB-IFOM.

Figure 9:
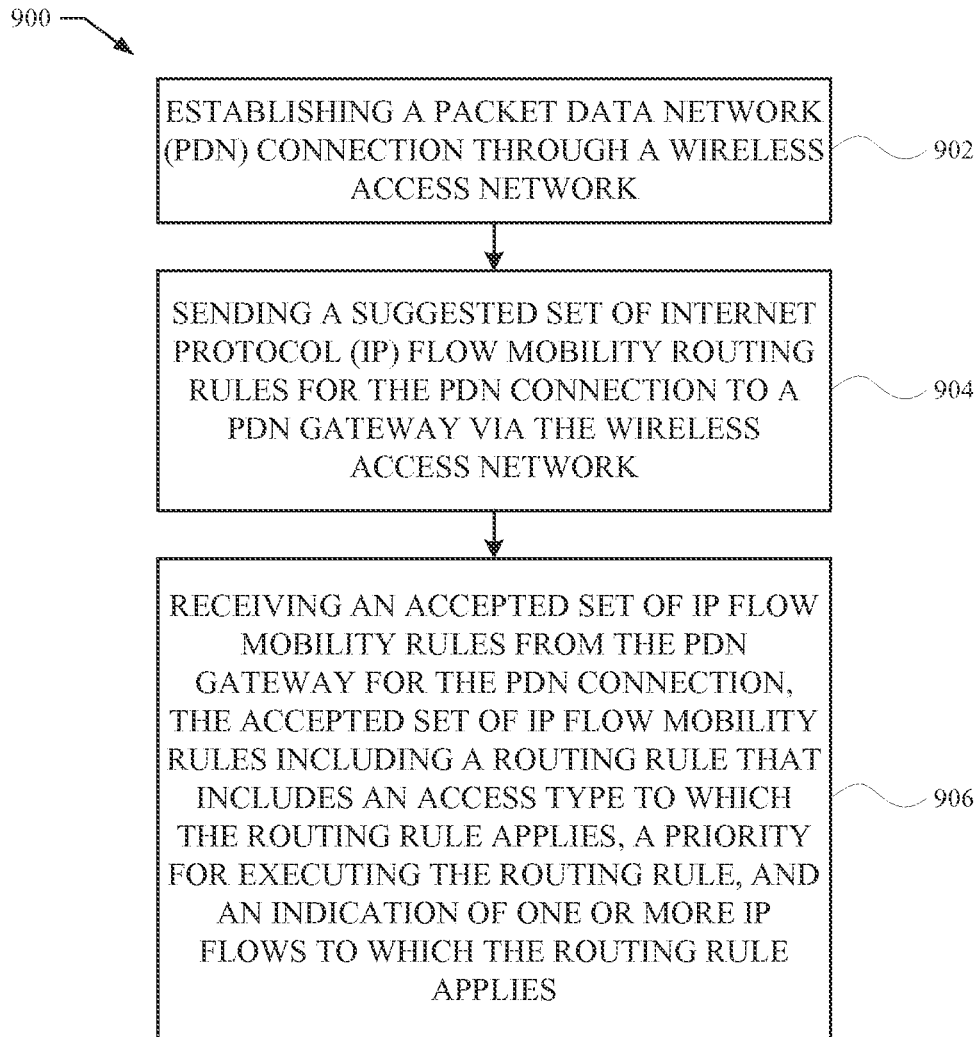
FIG. 9 illustrates a method to establish IP flow mobility rules for a packet data network connection, in accordance with some embodiments.

FIG. 9 illustrates a representative method 900 to establish IP flow mobility rules for a packet data network connection between a wireless communication device and a wireless cellular network. In step 902, the wireless communication device establishes a packet data network (PDN) connection with a wireless network via a wireless access network. In step 904, the wireless communication device sends a suggested set of IP flow mobility routing rules for the PDN connection to a PDN gateway. In step 906, the wireless communication device receives an accepted set of IP flow mobility rules from the PDN gateway for the PDN connection. In some embodiments, the accepted set of IP flow mobility routing rules includes a routing rule that includes an access type to which the routing rule applies, a priority for executing the routing rule, and an indication of one or more IP flows to which the routing rule applies. In some embodiments, an IP flow includes a set of IP packets communicated between a source address and source port number and a destination address and destination port number. In some embodiments, the routing rule includes an applicability field that determines whether the routing rule applies to future IP flows established after the routing rule takes effect or to both existing IP flows and to future IP flows. In some embodiments, accepted set of IP flow mobility routing rules further includes a default routing rule having a lowest priority and indicating a default route for IP packets.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to manage Internet Protocol (IP) flow mobility for a wireless device, the method comprising:
   by the wireless device:
   establishing a packet data network (PDN) connection via a first wireless access network;
   performing an IP access attachment via a second wireless access network;
   requesting addition of IP access via the second wireless access network to the established PDN connection;
   sending to a PDN gateway via the first wireless access network an IP flow mobility routing rule without a routing filter to indicate that no traffic is to be routed initially on the newly added IP access via the second wireless access network before assigning one or more IP flows to the IP access via the second wireless access network; and
   after confirmation of addition of the IP access via the second wireless access network to the established PDN connection, assigning the one or more IP flows to the IP access via the second wireless access network.

2. The method of claim 1, wherein the first wireless access network comprises a cellular wireless access network, and the second wireless access network comprises a wireless local area network (WLAN), and further comprising:
   by the wireless device:
   sending to the PDN gateway via the cellular wireless access network one or more non-access stratum (NAS) messages that include Protocol Configuration Options (PCO) and that indicate support for network-based IP flow mobility (NB-IFOM) when establishing the PDN connection.

3. The method of claim 2, further comprising:
   by the wireless device:
   sending to the PDN gateway via the cellular wireless access network a suggested set of IP flow mobility routing rules for the PDN connection; and
   receiving from the PDN gateway via the cellular wireless access network an accepted set of IP flow mobility rules for the PDN connection,
   wherein the accepted set of IP flow mobility routing rules includes a routing rule that comprises an access type to which the routing rule applies, a priority for executing the routing rule, and an indication of one or more IP flows to which the routing rule applies.

4. The method of claim 3, wherein an IP flow comprises a set of IP packets communicated between (i) a source address and source port number and (ii) a destination address and destination port number.

5. The method of claim 3, wherein the routing rule further comprises an applicability field that determines whether the routing rule applies to future IP flows established after the routing rule takes effect or to both existing IP flows and to future IP flows.

6. The method of claim 3, wherein the accepted set of IP flow mobility routing rules further includes a default routing rule having a lowest priority and indicating a default route for IP packets.

7. The method of claim 1, wherein the first wireless network comprises a wireless local area network (WLAN), and the second wireless network comprises a cellular access network, and further comprising:
   by the wireless device:
   sending to the PDN gateway through an evolved packet data gateway (ePDG) via the WLAN an Internet Key Exchange Version 2 (IKEv2) protocol signaling message that indicates support for network-based IP flow mobility (NB-IFOM) when establishing the PDN connection.

8. The method of claim 1, wherein the PDN gateway allocates an identical IP address for the IP access via the second wireless access network as used for the established PDN connection via the first wireless access network.

9. The method of claim 1, further comprising:
   by the wireless device:
   sending to the PDN gateway via the first wireless access network a request to assign the one or more IP flows from the first wireless access network to the IP access via the second wireless access network.

10. The method of claim 1, wherein the PDN gateway establishes a new General Packet Radio Service (GPRS) tunneling protocol (GTP) tunnel for the IP access via the second wireless access network, while maintaining a previously established GTP tunnel for IP access via the first wireless access network, when a valid routing rule exists for the IP access via the first wireless access network.

11. A wireless communication device configured for network-based Internet Protocol (IP) flow mobility (NB-IFOM), the wireless communication device comprising:
   wireless circuitry configurable to communicate via a first wireless access network and via a second wireless access network;
   one or more processors coupled to the wireless circuitry; and
   a memory coupled to the one or more processors,
   wherein the one or more processors are configured to execute instructions stored in the memory to cause the wireless communication device to:
   establish a packet data network (PDN) connection via the first wireless access network,
   perform an IP access attachment via the second wireless access network,
   request addition of IP access via the second wireless access network to the established PDN connection;
   send to a PDN gateway via the first wireless access network an IP flow mobility routing rule with a routing filter to indicate that no traffic is to be routed initially on the newly added IP access via the second wireless access network before assigning one or more IP flows to the IP access via the second wireless access network; and
   after confirmation of addition of the IP access via the second wireless access network to the established PDN connection, assign the one or more IP flows to the IP access via the second wireless access network.

12. The wireless communication device of claim 11, wherein the first wireless access network comprises a cellular wireless access network, and the second wireless access network comprises a wireless local area network (WLAN), and wherein execution of the instructions further causes the wireless communication device to:
   send to the PDN gateway via the cellular wireless access network one or more non-access stratum (NAS) messages that include Protocol Configuration Options (PCO) and that indicate support for network-based IP flow mobility (NB-IFOM) when establishing the PDN connection,
   send to the PDN gateway via the cellular wireless access network a suggested set of IP flow mobility routing rules for the PDN connection; and
   receive from the PDN gateway via the cellular wireless access network an accepted set of IP flow mobility rules for the PDN connection, wherein the accepted set of IP flow mobility routing rules includes a routing rule that comprises an access type to which the routing rule applies, a priority for executing the routing rule, and an indication of one or more IP flows to which the routing rule applies.

13. The wireless communication device of claim 12, wherein the routing rule further comprises an applicability field that determines whether the routing rule applies to future IP flows established after the routing rule takes effect or to both existing IP flows and to future IP flows.

14. The wireless communication device of claim 12, wherein the accepted set of IP flow mobility routing rules further includes a default routing rule having a lowest priority and indicating a default route for IP packets.

15. The wireless communication device of claim 11, wherein the PDN gateway allocates an identical IP address for the IP access via the second wireless access network as used for the established PDN connection via the first wireless access network.

16. The wireless communication device of claim 11, wherein execution of the instructions further causes the wireless communication device to:
send to the PDN gateway via the first wireless access network a request to assign the one or more IP flows from the first wireless access network to the IP access via the second wireless access network.

17. The wireless communication device of claim 11, wherein the PDN gateway establishes a new General Packet Radio Service (GPRS) tunneling protocol (GTP) tunnel for the IP access via the second wireless access network, while maintaining a previously established GTP tunnel for IP access via the first wireless access network, when a valid routing rule exists for the IP access via the first wireless access network.

18. A non-transitory computer-readable medium storing instructions that, when executed by one or more processors of a wireless communication device, cause the wireless communication device to:
establish a packet data network (PDN) connection via a first wireless access network;
perform an Internet Protocol (IP) access attachment via a second wireless access network;
request addition of IP access via the second wireless access network to the established PDN connection;
send to a PDN gateway via the first wireless access network an IP flow mobility routing rule without a routing filter to indicate that no traffic is to be routed initially on the newly added IP access via the second wireless access network before assigning one or more IP flows to the IP access via the second wireless access network; and
after confirmation of addition of the IP access via the second wireless access network to the established PDN connection, assign the one or more IP flows to the IP access via the second wireless access network.

19. The non-transitory computer readable medium of claim 18, wherein:
the first wireless access network comprises a cellular wireless access network, and the second wireless access network comprises a wireless local area network (WLAN); and
execution of the instructions further causes the wireless communication device to:
send to the PDN gateway via the first wireless access network one or more non-access stratum (NAS) messages that include Protocol Configuration Options (PCO) and that indicate support for network-based IP flow mobility (NB-IFOM) when establishing the PDN connection.

20. The non-transitory computer readable medium of claim 19, wherein execution of the instructions further causes the wireless communication device to:
send to the PDN gateway via the cellular wireless access network a suggested set of IP flow mobility routing rules for the PDN connection; and
receive from the PDN gateway via the cellular wireless access network an accepted set of IP flow mobility rules for the PDN connection,
wherein the accepted set of IP flow mobility routing rules includes a routing rule that comprises an access type to which the routing rule applies, a priority for executing the routing rule, and an indication of one or more IP flows to which the routing rule applies.

* * * * *